BINARY SQUARE ROOT MECHANIZATION

Filed Jan. 13, 1958 11 Sheets-Sheet 1

INVENTORS
THEODORE M. HERTZ
FREDERICK H. YOUNG
BY John A. Duffy
AGENT

Aug. 14, 1962 T. M. HERTZ ET AL 3,049,296

BINARY SQUARE ROOT MECHANIZATION

Filed Jan. 13, 1958 11 Sheets-Sheet 2

INVENTORS
THEODORE M. HERTZ
FREDERICK H. YOUNG

BY

John A. Duffy
AGENT

INVENTORS
THEODORE M. HERTZ
FREDERICK H. YOUNG
BY John a Duffy
AGENT

INVENTORS
THEODORE M. HERTZ
FREDERICK H. YOUNG
BY John A Duffy
AGENT

Aug. 14, 1962 T. M. HERTZ ET AL 3,049,296
BINARY SQUARE ROOT MECHANIZATION
Filed Jan. 13, 1958 11 Sheets-Sheet 5

INVENTORS
THEODORE M. HERTZ
FREDERICK H. YOUNG
BY John A Duffy
AGENT

INVENTORS
THEODORE M. HERTZ
FREDERICK H. YOUNG
BY John A. Duffy
AGENT

INVENTORS
THEODORE M. HERTZ
FREDERICK H. YOUNG
BY John A. Duffy
AGENT

INVENTORS
THEODORE M. HERTZ
FREDERICK H. YOUNG
BY
John A Duffy
AGENT

INVENTORS
THEODORE M. HERTZ
FREDERICK H. YOUNG
BY John A Duffy
AGENT

INVENTORS
THEODORE M. HERTZ
FREDERICK H. YOUNG
BY John A. Duffy
AGENT

INVENTORS
THEODORE M. HERTZ
FREDERICK H. YOUNG
BY
John A. Duffy
AGENT

United States Patent Office 3,049,296
Patented Aug. 14, 1962

3,049,296
BINARY SQUARE ROOT MECHANIZATION

Theodore M. Hertz, Whittier, Calif., and Frederick H. Young, Missoula, Mont., assignors to North American Aviation, Inc.

Filed Jan. 13, 1958, Ser. No. 708,631
10 Claims. (Cl. 235—158)

This invention relates to electronic digital computers and more particularly to a system for extracting the square root of a binary number.

Electronic computers employing binary numbers are well-known and have provided a significant improvement in the operation on numbers. An electronic computer performs a multitude of arithmetic operations such as addition and subtraction in accordance with the solving of a problem presented to the computer. One such operation is the extraction of a square root of a number. Extraction of the square root is a frequent requirement in the solving of many problems among which are those involving communications and electrical power network problems. Among the several different types of electronic computers utilized to perform operations such as the square root, one of the better known types is the binary serial digital computer which performs arithmetic operations bit by bit in a manner similar to the common way of adding numbers.

Notwithstanding the highly accurate and extremely fast time characteristics of today's computers there has been almost a total lack of simplicity in the design. A multitude of routines and subroutines which involve complicated instructions or programming and also numerous storage facilities are often designed for a simple arithmetic operation in a computer. Performing the operation of taking the square root of a number which is similar to division is a simple arithmetic operation which requires additional time to perform the operation because of the numerous instructions to the programmer.

The device of this invention provides a method for extracting the square root of a binary number in a digital computer in a simple and fast manner. The extraction of a root is performed in the same time required by other similar operations such as division and multiplication. A single computer command provides the only necessary control outside the computer. A simple and effective storage means is provided to store the results of the various steps in the computation. Upon receipt of the command the computer automatically extracts the square root from the binary number and stores the answer in a storage register in the computer.

In accordance with the device of this invention a serial digital binary computer is provided which receives a binary number as its input, extracts the square root of the number and presents the answer in binary form as its output. The computer disclosed herein acts upon successive binary bits of the binary number known as the operand sequentially and in a novel manner to produce the square root of the operand. Storage means are provided for storing the input number and the various numbers produced in the operation of the square root process. An arithmetic unit receives the information from the storage means in the form of a series of voltage pulses and modifies the information in a predetermined logical manner to produce the square root of a binary number. The procedure for acting upon the data in the arithmetic unit is entirely and automatically determined by the logical circuitry which is mechanized in the form of electronic circuits in the arithmetic unit. The routing of the bits of the binary numbers through the system is controlled by a timing means which is synchronized with the storage means to provide a proper sequence and time interval in presenting the voltage pulses representing the binary bits to the components in the computer system.

It is therefore an object of this invention to provide a device for extracting the square root of a binary number.

It is another object of this invention to provide an improved and faster method for extracting the square root of a binary number.

It is still another object of this invention to provide an improved and simple method for extracting the square root of a binary number in which the steps of computation are sequentially and automatically performed in a computer.

It is a further object of this invention to provide a computer for extracting the square root of a binary number with a single command.

It is a still further object of this invention to provide a computer for extracting the square root of a number in a simple and fast manner which may be adapted to other normal arithmetic operations.

It is another object of this invention to provide a computer for taking the square root of a number utilizing fewer and simpler components in a single command sequence.

Other objects will become apparent from the following description taken in connection with the accompanying drawings in which.

Figure 4:
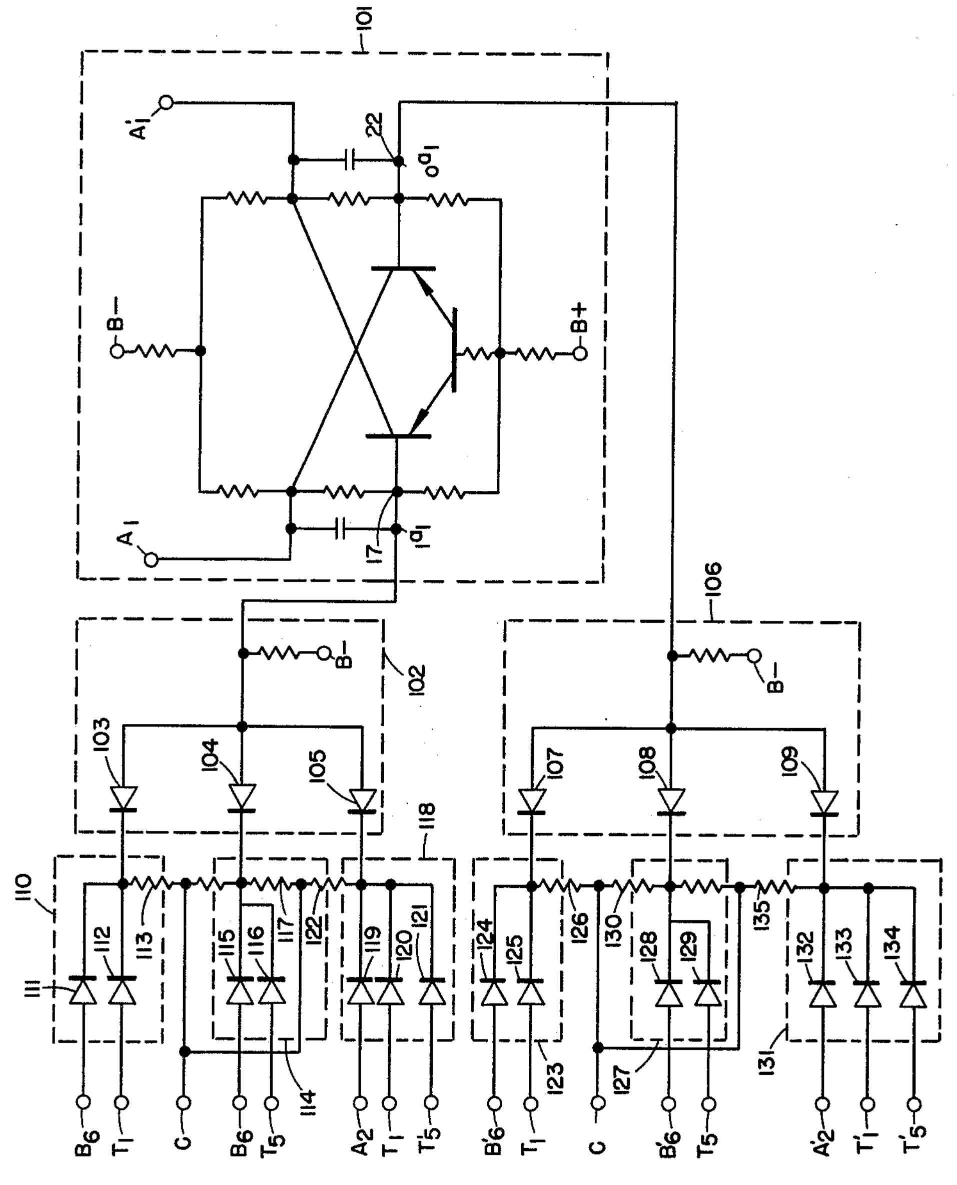
Figure 5:
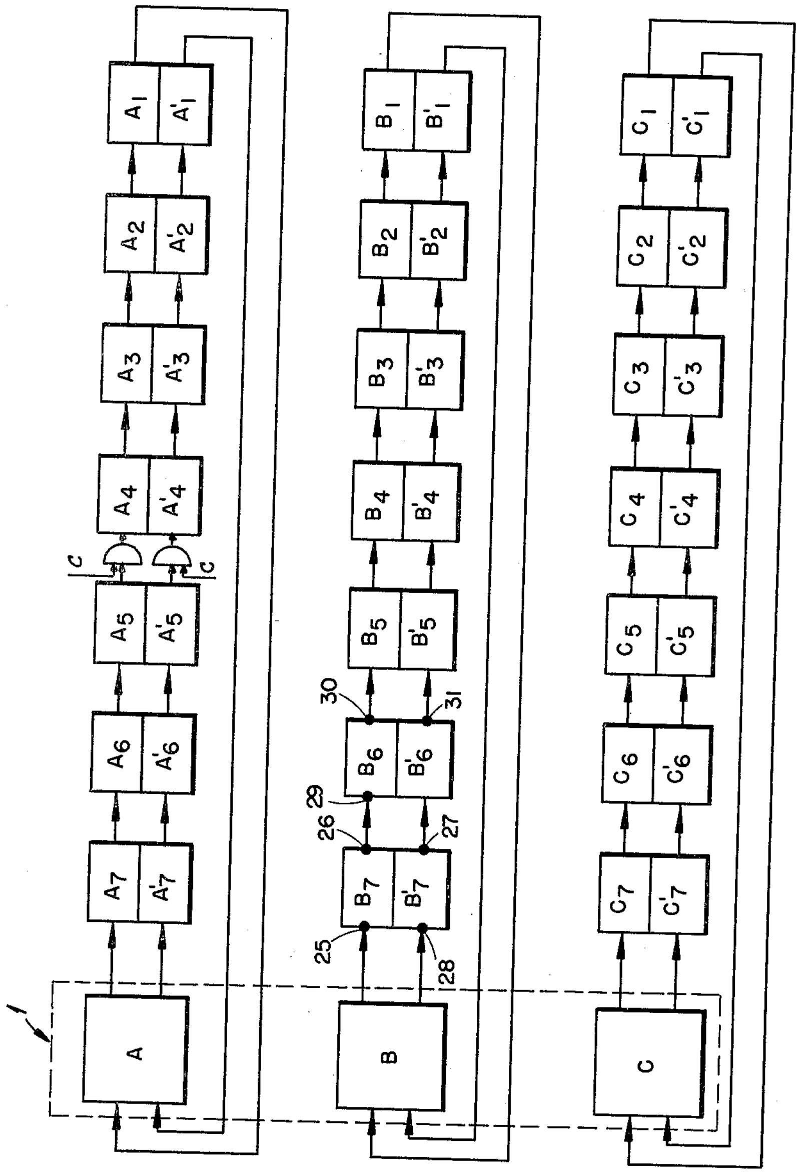
Figure 6:
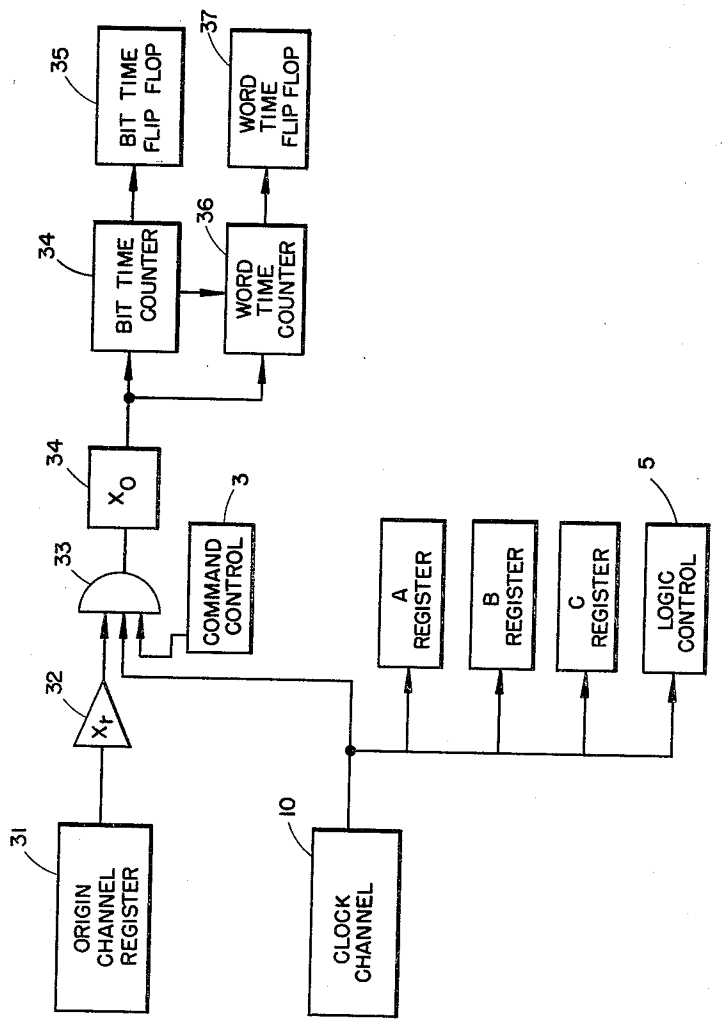
Figure 7:
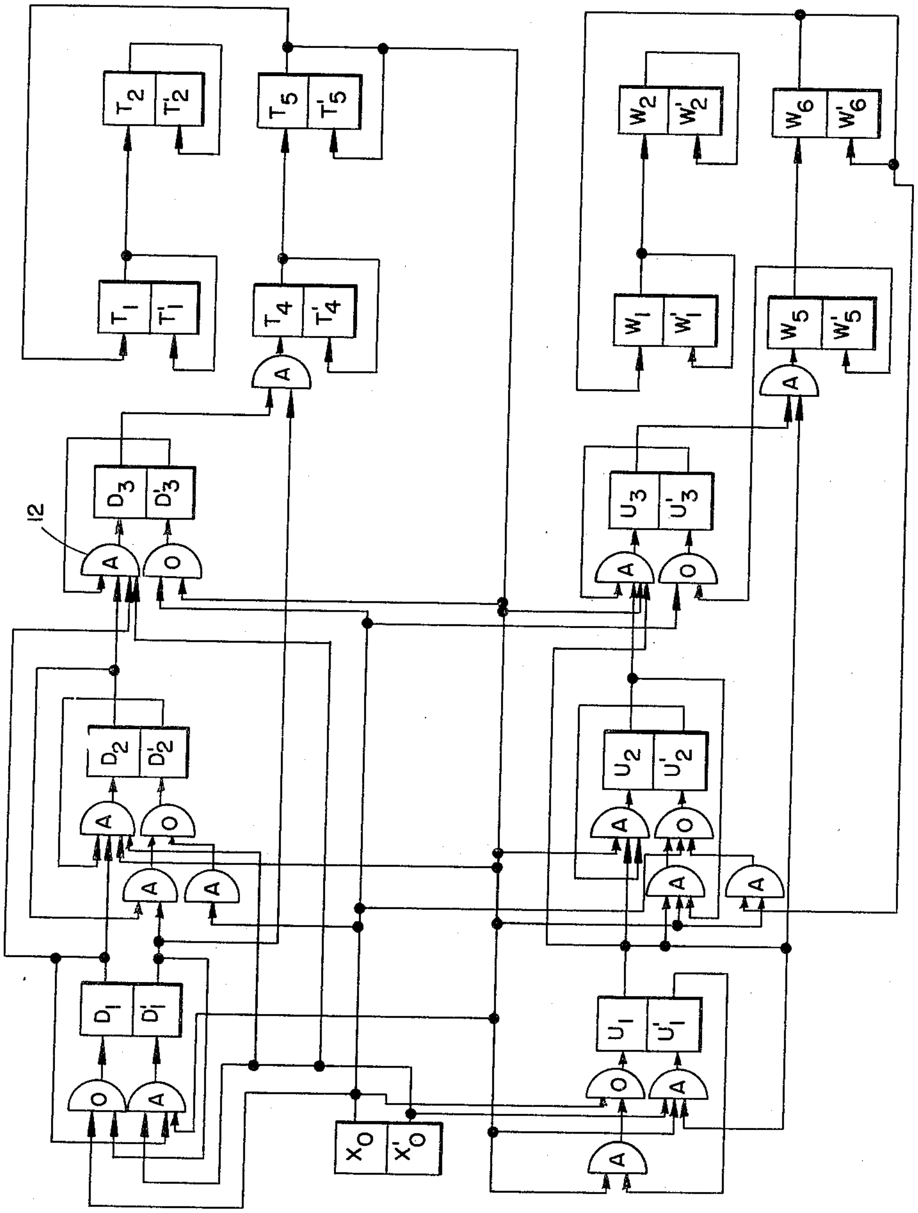
Figure 8:
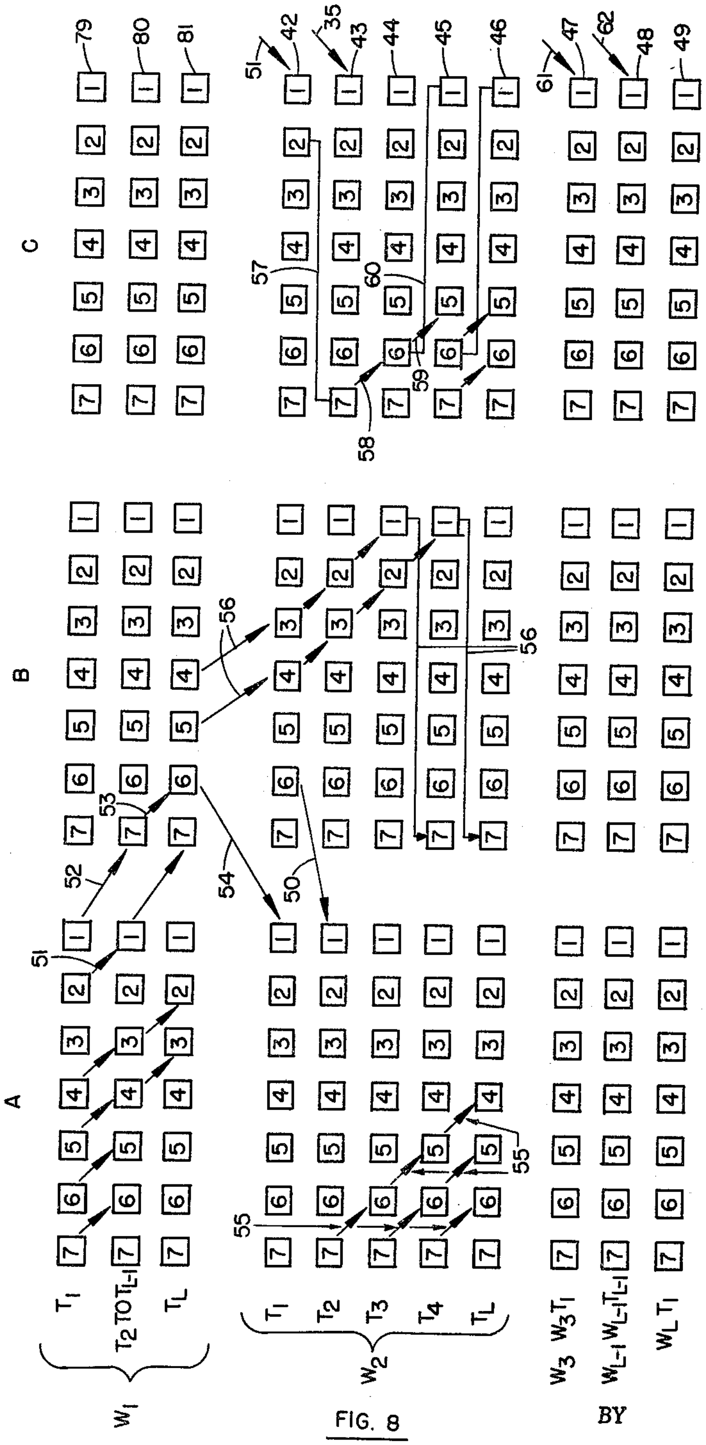
Figure 9:
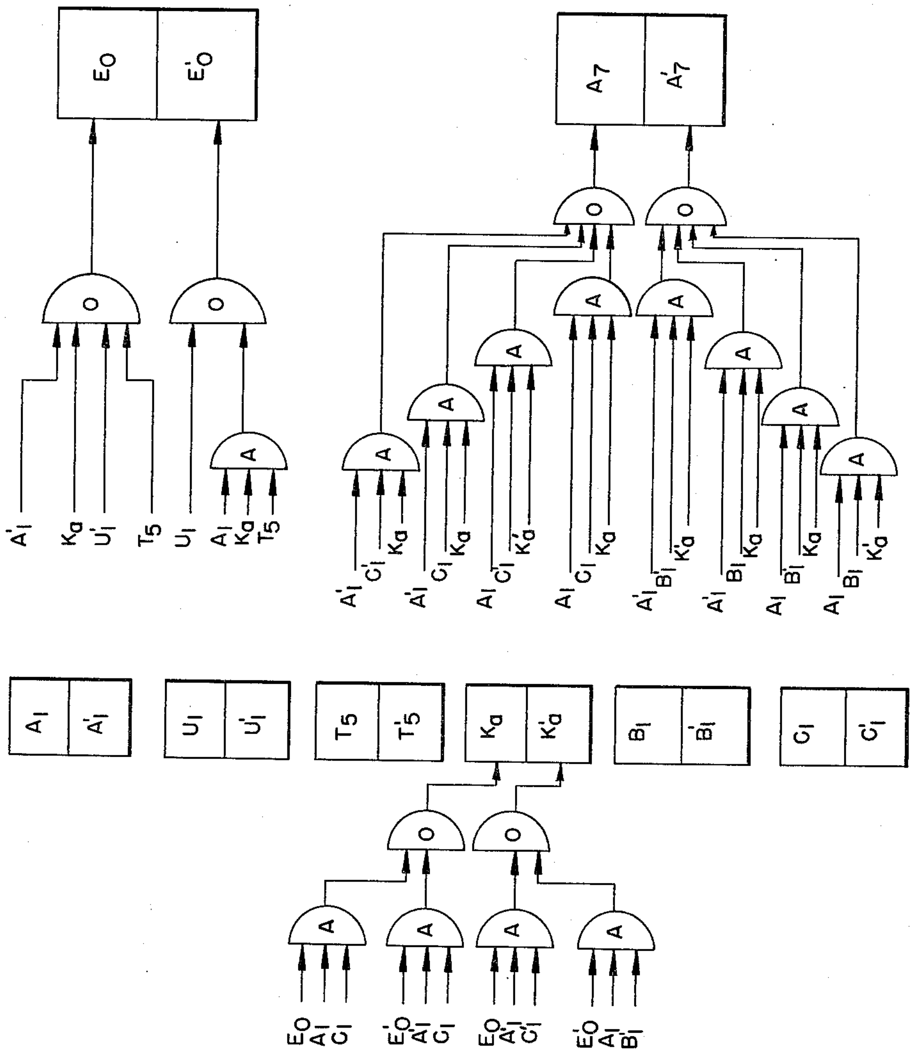
Figure 10:
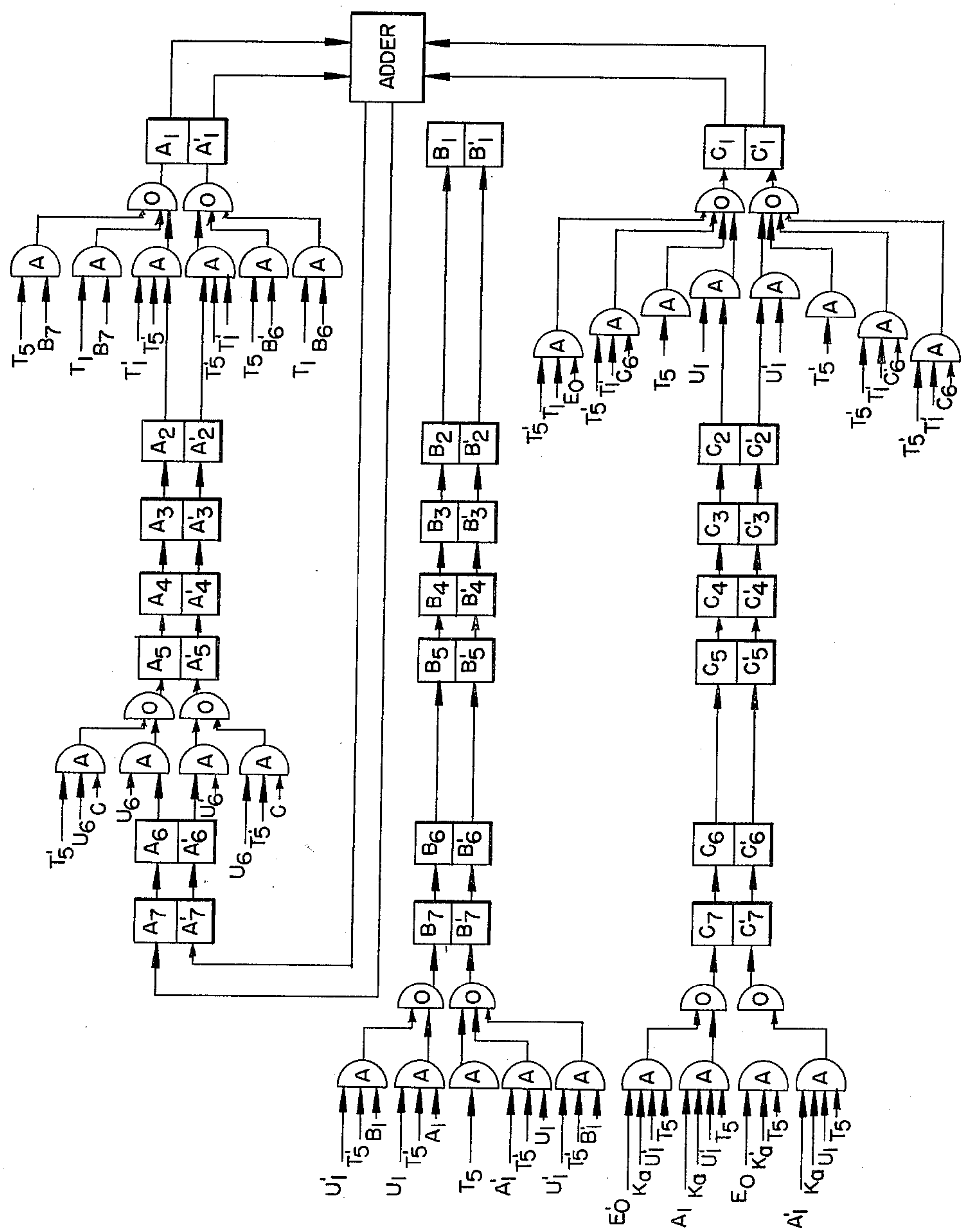
Figure 11:
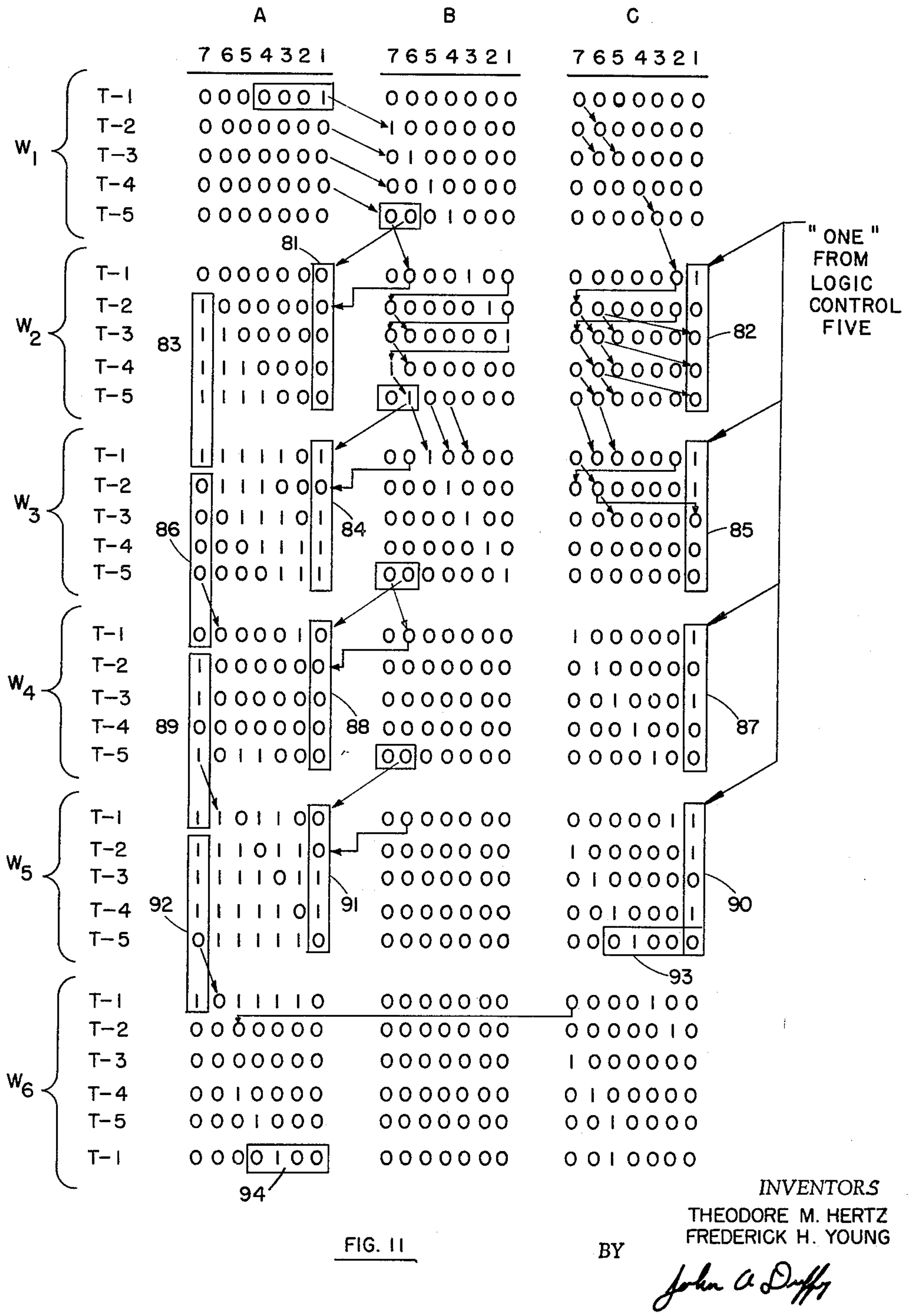

FIGS. 3*a* and 3*b* illustrate a typical flip flop;

FIG. 4 is a schematic diagram showing the complete circuitry necessary to mechanize the logical equations for a typical flip flop;

FIG. 5 is a schematic diagram of the three storage registers used to store the partial results obtained during the operation;

FIG. 6 is a diagram of the timing used in the device of this invention;

FIG. 7 shows in detail the schematic diagram of the means for counting the time disclosed in FIG. 6;

FIG. 8 is a schematic diagram illustrating the sequential operation of the flip flops in the storage registers of the computer;

FIG. 9 is a schematic diagram of the circuitry used in the adding and subtracting portion of the operation;

FIG. 10 is a schematic diagram illustrating the mechanization of the circuitry of the invention; and FIG. 11 is a schematic diagram showing the step by step operation and location of 1's and 0's of the bits in the computer system during the performance of the square root operation.

The method for taking the square root of a number to be described employs a computer which utilizes the binary system of numbers. It will be assumed that such a system is sufficiently known to persons in the art so as not to require detailed discussion. Complete information on the binary system may be obtained from texts concerning the theory of numbers and general mathematical texts. As is conventional, the two binary bits employed will be referred to as 0 (zero) and 1 (one) in the discussion that follows.

In order to fully understand the invention, an explanation will now be given of the basis for finding arithmetic square roots. A common and well-known way of finding the square root of a decimal number X is to estimate a root $R_1$ of $X_1$ the operand during the first step and obtain a remainder $A_1$ equal to $X-R_1^2$. Then an increment $h_1$ is estimated so that $h_1(2R_1+h_1)$ is less than or equal to the remainder $A_1$. This yields a closer estimate of the root, $R_2=R_1+h_1$ and the difference $A_1-h_1(2R_1+h_1)$ becomes the remainder $A_2$ during the second step. Thus in the general step $R_{i+1}=R_i+h_i$ and $A_{i+1}=A_i-h_i(2R_i+h_i)$.

The following example illustrates the taking of a square root of a decimal number:

DECIMAL EXAMPLE

Find: $\sqrt{.063504}$

| | | | |
|---|---|---|---|
| | . 2 5 2 | | |
| | $\sqrt{.063504}$ | | |
| | .04 | $R_1=.2$ | |
| .45 | .0235 | $h_1=.05$ | $A_1=.023504$ |
| | .0225 | $R_2=.25$ | |
| .502 | 1004 | $h_2=.002$ | $A_2=.001004$ |
| | 1004 | $R_3=.252$ | |
| | 0000 | | $A_3=.000000$ |

Finding the square root of a binary number may be accomplished arithmetically in a way similar to that described for a decimal number. In order for the process to be performed in a computer, certain simplifications and changes in the rules must be created. An automatic computer usually does not have the ability to retain relative magnitudes of numbers by inspection as does a person. Therefore, the square root of a binary number cannot be taken in an automatic computer the same way that it could be done by a person with a pencil. In taking the square root of a binary number, positive fractions only will be considered. In order to make the computation an automatic one, a first routine is developed in which the number 1 is always tried as a next bit in $R_i$ ($i$ denoting a step) giving an increment $h_i$ always equal to $2^{-i-1}$. If the number 1 does not work ($A_i$ is negative), the previous remainder $A_i$ is restored and a 0 is inserted as the next bit $h_i$ before continuing. This provides a restoring square root procedure which will be described in detail later. From the decimal computation described above, Equation 1 is readily obtained for estimating the partial roots during each step of the operation.

$$A_i=h_i(2R_i+h_i) \quad (1)$$

Therefore, it follows that the general step also described in the decimal analysis is provided by Equation 2.

$$A_{i+1}=A_i-h_i(2R_i+h_i) \quad (2)$$

Substituting $h_i=2^{-i-1}$ we obtain Equation 3 for the general step in a binary system.

$$A_{i+1}=A_i-2^{-i-1}(2R_i+2^{-i-1}) \quad (3)$$

Simplifying, we obtain Equation 4.

$$A_{i+1}=A_i-2^{-i}(R_i+2^{-i-2}) \quad (4)$$

If the remainder obtained from any of the steps is negative, steps must be taken to nullify the operation which obtained the negative remainder. One straightforward way to nullify this operation which is basically a subtraction is to add Expression 5, $$2^{-i}(R_i+2^{-(i+2)}) \quad (5)$$

back into the remainder $A_{i+1}$ to restore $A_i$ and then proceed to the next step $i+2$. This next step may be accomplished by Equation 6.

$$A_{i+2}=A_i-2^{-(i+1)}(R_i+2^{-(i+1)-2}) \quad (6)$$

Rewriting, Equation 7 is obtained.

$$A_{i+2}=[A_i-2^{-i}(R_i+2^{-i-2})]+2^{-i-1}[R_i+3(2^{-i-3})] \quad (7)$$

It is noted that in Equation 7 the quantity in the left hand bracket is equal to the expression on the right hand side of Equation 4 which is the general step $A_{i+1}$. Therefore, in order to simplify the operation when a negative remainder is obtained instead of adding back the subtracted quantity to restore $A_i$ and then proceeding on to step $i+2$, the two procedures may be combined by adding the quantity in the right hand brackets of Equation 7 to the remainder $A_{i+1}$ in step $i+1$. This action is similar to the well-known principle of non-restoring division which is amply described, for example, in Richards, Arithmetic Operations in Digital Computers, beginning on page 169. Therefore, if the remainder $A_i$ is positive, the equation for the next step $A_{i+1}$ is Equation 8, $$A_{i+1}=A_i-2^{-i}(R_i+2^{-i-2}) \quad (8)$$

and if the remainder $A_i$ is negative, the equation for the next step is Equation 9.

$$A_{i+1}=A_i+2^{-i}(R_i+(3)2^{-i-2}) \quad (9)$$

The following example of taking the square root of a binary number using Equations 8 and 9 above will further explain the above described method.

EXAMPLE 1÷FIND $\sqrt{.0001}$

| | Operand | Root |
|---|---|---|
| | 000.0001 | |
| | 00.01 | |
| $A_1$ | 111.1101 | $R_1=.0$ |
| | 0.0011 | |
| $A_2$ | 000.0000 | $R_2=.01$ |

In the example above, the operand 000.0001 is first operated on by subtracting 00.01 from it to obtain the first remainder $A_1$ 111.1101. Since $A_1$ is negative, $R_1$ is equal to .0 and Equation 9 is used to obtain the number .0011 which is derived from the expression $2^{-i}(R_i+(3)2^{-i-2})$ of Equation 9 and is to be added to $A_1$ to obtain $A_2$. It is to be noted that the $A_1$ remainder is a negative number which is expressed by the binary complement of its true number. Such a subtraction operation is well-known in the computer art and may be found, for example, in Richards, page 119. When the number 0.0011 is subtracted from $A_1$ in the second step, the remainder $A_2$ which is 000.0000 is obtained. Since $A_2$ is equal to 0, $R_2$ is equal to .01. From this example, it is readily ascertained that further steps are unnecessary since there is no remainder left after the second step of operation, and the root of binary number .0001 is exactly .01.

Figure 1:
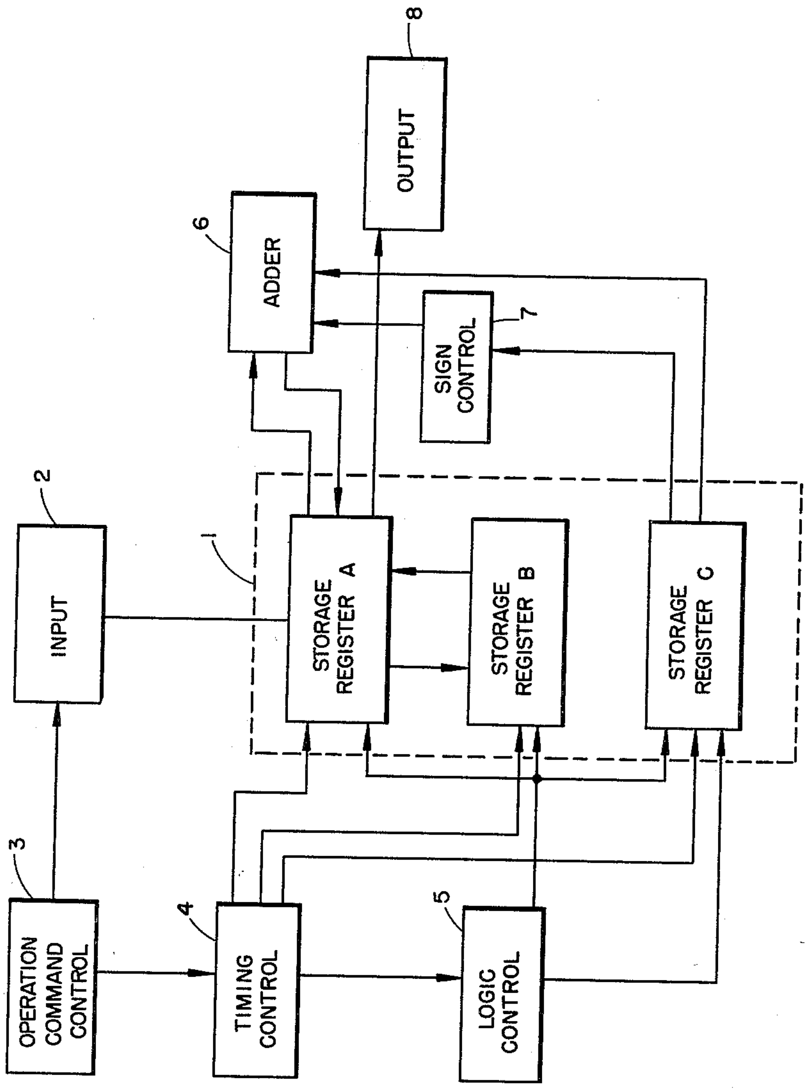
FIG. 1 is a simple schematic diagram in block form illustrating the device of this invention.

Turning now to the description of the device of this invention, in FIG. 1 there is shown in simplified block form the principal components of this invention which are utilized in the process of extracting the square root of a binary number according to the arithmetic method just described. In FIG. 1 there is shown a storage means 1 which comprises storage registers A, B, and C. Storage registers A, B, and C provide convenient memory means for storing binary bits in the computer. Associated with storage means are means to be described later for introducing and abstracting information from the storage means in order for the computer to provide operation in addition to data storage functioning. Storage means 1 receives information in the form of binary input bits from input device 2 which comprises suitable electronic switching means not a part of this invention and well-known in the art which provide the operand in binary form to storage means 1. Operation command control 3 provides the necessary programming command to the computer instructing the computer to take the square root of a number. Associated with the storage means 1 and the entire functional operation of the computer is timing control 4 which provides the necessary timing and sequencing in the routing of the bits throughout the computer system. Storage means 1 serves to store the binary number in the form of spots of magnetism on a movable magnetic element which may be, for example, a rotating disc. Suitable read and write heads are used in cooperation with the rotating disc to read or write the data as required in the solution of the mathematical problem. Logical control 5 receives the data from storage means 1 in the form of a series of pulses sequenced and timed by timing control 4 and modifies the information in a predetermined manner to produce information which is in turn fed to storage means 1. In addition, logical control 5 provides the necessary control for the shifting of the A, B, and C registers of storage means 1. Adder device 6 in cooperation with sign control 7 receives binary information from storage registers A and C and adds binary numbers stored therein and stores the answer in storage register A. The square root may be stored in storage register A. The answer may, if desired, be transferred from storage register A to output 8 by suitable output reading means.

Functionally, upon receipt of an operation command control, input device 2 supplies storage means 1 with a binary number from which the square root is to be extracted. Storage registers A, B, and C in response to control from logical control 5 and timing control 4 automatically perform the step by step operations necessary to provide the square root. Storage register A stores the root which is then presented to output means 8.

Figure 2:
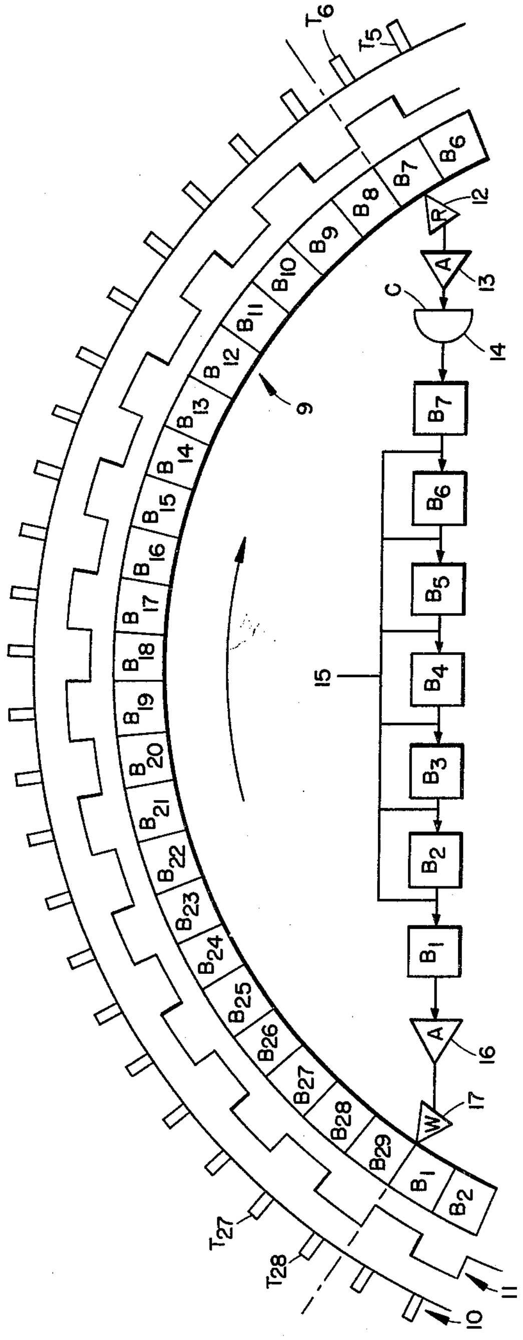
FIG. 2 is a schematic diagram of the preferred memory unit employed for storing the numbers utilized in the computer system.

Turning now to FIG. 2 there is shown a schematic diagram illustrating the manner in which the binary information is stored in storage registers A, B, and C of storage means 1. As shown in FIG. 2, a storage medium of rotating magnetic disc type is provided to store bits of the number in cooperation with various flip flops. While FIG. 2 shows a rotating magnetic disc type, it is to be understood that any of the other well-known types of storage devices such as punched tape and the like may be utilized. In FIG. 2 there is shown for illustration purposes the B register only. The A and C registers are arranged to function the same as the B register and are not shown for clarity reasons. The recording medium of magnetic disc 9 may be saturated to indicate a positive state or 1, and in an unsaturated state to indicate a negative state or 0. Located on magnetic disc 9 are several channels which store information. Each register has a corresponding channel located on magnetic disc 9 and the waveform of the B register channel which is typical of the A, B, and C channels is shown as channel 11. A clock channel 10 has permanently recorded information which is a continuous series of alternate 1's and 0's. A cycle is a 1 pulse and a 0 pulse. Clock channel 10 furnishes clock pulses which control the timing to every flip flop in the system. Every AND gate associated with the input to the flip flops will include a pulse signal originating from clock channel 10. B register waveform 11 is shown as a square waveform with the upper portion indicating the magnetized state and the lower portion indicating a demagnetized state. A change in the de-magnetized state of waveform 11 is sensed by reading and writing means and fed to the flip flops of the B register. Memory read head 12 is connected to sense the changes in state of magnetization of the B register channel and feeds an output signal through read amplifier 13 to AND gate 14. AND gate 14 produces a signal upon synchronization of a signal from the B register channel and a signal from the clock channel and feeds it into flip flop $B_7$. Flip flops $B_6$, $B_5$, $B_4$, $B_3$, $B_2$, and $B_1$ are then sequentially triggered, each receiving a signal from the previous flip flop in synchronization with a timing signal from clock channel 10 to AND gates 15 associated with each of the flip flops. Read head 12, read amplifier 13, and the B flip flops are external to disc 9 and information is continuously being circulated through the flip flops from signals received from read head 12. Write amplifier 16 receives a signal from flip flop $B_1$ and feeds the signal to write head 17 which transfers the information to the B register channel on disc 9. The number of external B flip flops depends upon the logical design of the computer. For explanation purposes, it will be assumed that there are 7 flip flops and 22 bits stored on disc 9 for each register. Disc 9 rotates in a direction from the write head to the read head and digits stored on the disc and in the B flip flops are continuously shifted or recirculated by means of the disc, the read head 12, the B flip flops, and write head 17. This is known as volatile storage or recirculation. The motion of disc 9 is from left to right and the time sequencing determined by clock channel 10 is from right to left. In other words, a binary number stored in the B register may be stored partly in the B channel on disc 9 and partly in the B flip flops. The number is continuously being recirculated from the disc to the flip flops and back to the disc again in accordance with timing controlled by the clock channel 10. For example, assuming for purposes of illustration that a binary number of 29 digits is stored in the B register. The clock channel has 29 clock pulses in order to time the recirculation procedure. Assume now, for example, that read head 12 has just passed through time $T_6$ reading the information stored at the $B_7$ portion of waveform 11. Immediately after $T_5$ digit $B_6$ is stored in flip flop $B_7$ through read head 12, read amplifier 13, and AND gate 14. On the other side of the disc digit $B_{29}$ is stored in flip flop $B_1$. Half a digit later of disc motion between time $T_5$ and $T_6$ read head 12 senses digit $B_7$. Still later at the time $T_6$ digit $B_7$ is shifted into the $B_6$ flip flop and digit $B_1$ is shifted into write head 17 which writes digit $B_1$ on the B register channel of disc 9. Upon the next cycle of operation, the digit stored in the $B_6$ flip flop is transferred to the $B_5$ flip flop which in turn transfers the digit stored therein to the $B_4$ flip flop thereon through the remaining B flip flops and write head 17 into disc 9. Thus it can be seen that at every cycle determined by a clock pulse, one digit of the binary number stored in the B register is transferred clockwise one bit. In other words, each digit of the binary number is recirculated one bit for each pulse time determined by clock channel 10. AND gates 15 are located between each of the B flip flops and receive a synchronizing clock pulse from clock channel 10 in the same manner as described in conjunction with AND gate 14 and flip flop $B_7$. Every flip flop in the computer to be herein described contains an AND gate which receives a clock pulse in order to pass a signal to the input of the flip flop. While FIG. 2 shows the schematic diagram for the B register only, the diagram for the C and A registers is assumed to be the same and will not be shown for simplicity reasons. The A and C registers are constructed in the the same manner as the B register shown in FIG. 2, each forming a recirculation path determined by the clock channel 10 and the rotating magnetic disc 9.

Figure 3:
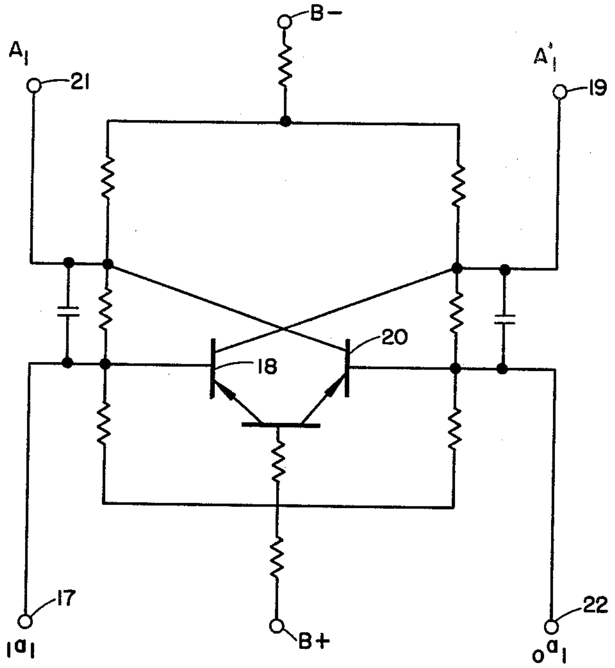
Figure 3:
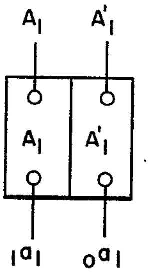

Turning now to FIG. 3 there is shown in FIG. 3*a* the circuitry of a typical flip flop utilized in the operation of the computer. The flip flop shown in FIG. 3*a* consists of a standard bistable multivibrator having two outputs, one indicating a true state of the flip flop and the other indicating the false state of the flip flop. The flip flop, in addition, has two inputs, one being a true input and the other being a false input. It is to be noted here that all true conditions are representative of binary digit 1 and all false conditions are representative of binary digit 0.

In FIG. 3*a* an input signal to terminal 17 which is fed to the base of transistor 18 causes conduction, lowering the potential at terminal 19 of the output circuit. Transistor 20 is cut off by the conduction of transistor 18 through bistable coupling operation, thereby raising the potential at output terminal 21. Output terminal 21 being at a comparatively negative potential is indicative of a truth signal and output terminal 19 having a comparative positive potential is indicative of a false signal. Upon recepit of a signal from input terminal 22 to the base of transistor 20 the transistor is triggered to change states wherein output terminal 21 now is at a comparatively positive potential denoting a false signal and output terminal 19 is at a comparatively negative potential denoting a truth signal. The flip flop of FIG. 3*a* is now in what may be called a true condition with transistor 20 normally conducting and transistor 18 normally cut off. For purposes of explanation in relation to the logical design of the computer, each flip flop will be given identifying symbols to show their two output points and their two input points. In FIG. 3*a*, for example, the flip flop may be denoted as the $A_1$ flip flop. Input terminal 17 of flip flop $A_1$ will be symbolized by the notation ${}_1a_1$. An input signal to terminal 17 symbolized by ${}_1a_1$ will set the flip flop to a true condition if the flip flop is in the false condition, but will not affect the flip flop if it is already in a true condition. Input terminal 22 of flip flop A will be symbolized as ${}_0a_1$. An input signal denoted by ${}_0a_1$ at terminal 22 will set flip flop $A_1$ to the false condition if it previously was in the true condition and it likewise will not affect the flip flop operation if it was previously in the false condition. The two stable conditions of flip flop $A_1$ are designated true and false and are represented by the upper case letter and its prime of the flip flop. Thus, for example, output terminal 21 of flip flop A is denoted as $A_1$ and output terminal 19 of flip flop A is denoted as $A'_1$. If terminal 21 is at a comparative negative potential with transistor 20 conducting and transistor 18 nonconducting, flip flop A is in the true condition with $A_1$ equal to 1 and $A'_1$ equal to 0. On the other hand if the potential at terminal 21 is comparatively positive with transistor 20 cut off and transistor 18 conducting, the flip flop is in the false condition with $A_1$ equal to 0 and $A'_1$ equal to 1.

Turning now to FIG. 3*b* there is shown in schematic form the input and output terminals of flip flop $A_1$ of FIG. 3*a* in related symbols. An input signal denoted by ${}_1a_1$ into terminal 17 will set the flip flop in the true condition wherein $A_1$ is equal to binary digit 1 and $A'_1$ is equal to 0. An input signal into terminal 22 symbolized by ${}_0a_1$ will set the flip flop in the false condition with $A_1$ equal to 0 and $A'_1$ equal to 1. It is to be noted that the flip flop shown in FIG. 3*b* in the true condition has $A_1$ equal to 1 and $A'_1$ equal to 0. The flip flop also has a binary condition which is either a "0" or a "1." In the flip flop of FIG. 3*b* when $A_1$ equals 1 and $A'_1$ equals 0 the flip flop is in binary condition 1, and when $A'_1$ is equal to 1 and $A_1$ is equal to 0 the flip flop is in binary condition 0.

In order to understand the relationship between the operation of the flip flops and associated circuitry of this invention, reference will now be made to the logical design which enables the circuitry to perform the operations necessary to extract the square root from a binary number. The logical design of this invention is achieved entirely by the application of Boolean algebra. It will be assumed that the principle of logical equations utilizing Boolean algebra is sufficiently well-known to persons skilled in computer art so as not to require detailed discussion, however a brief explanation will be given of the various symbols used in this invention and the specific method of writing the logical equations. For example, in the equation ${}_1a_1=A'_1C$, flip flop $A_1$ is set to true condition whenever it is in the false condition $A'_1$ and a clock pulse C is received. Similarly in the equation ${}_0a_1=A_1C$, flip flop $A_1$ is set to the false condition whenever it is in the true condition $A_1$ and a clock pulse is received. Thus, it can be seen that the symbol for the condition of a flip flop is denoted by a capital letter having a prime for the false condition and no prime for the true condition.

In order to more fully understand the relationship between the logical equations and the electronic circuitry which mechanizes these equations, the circuitry of flip flop $A_1$ is shown in FIG. 4 to illustrate a typical mechanization of a logical equation. The complete logical equation for the $A_1$ flip flop is as follows:

$$A_1{:}\ {}_1a_1=B_6T_1C+B_6T_5C+A_2T_1T'_5C$$
$${}_0a_1=B'_6T_1C+B'_6T_5C+A'_2T'_1T'_5C$$

For the present only the circuitry which mechanizes the above equations will be shown. No attempt will be made to correlate the $A_1$ flip flop with the other flip flops and logic of the invention. In FIG. 4 the $A_1$ flip flop is enclosed by 101. Point 17 of $A_1$ receives the input ${}_1a_1$ and point 22 receives the input ${}_0a_1$ previously described in relation to FIG. 3. OR gate 102 is connected to present an operating signal to point 17 upon receipt of a signal at diode 103, or diode 104, or diode 105. OR gate 106 is connected to present an operating signal to point 22 upon receipt of a signal at diode 107, or diode 108, or diode 109. AND gate 110 is connected to present an operating signal to diode 103 upon receipt of an operating signal at diode 111 from the output of flip flop $B_6$ (when in its true condition), and an operating signal at diode 112 from flip flop $T_1$ (when in a true condition), and a clock signal from C at resistor 113. AND gate 114 is connected to present an operating signal to diode 104 upon receipt of an operating signal from $B_6$ at diode 115, $T_5$ at diode 116, and C at resistor 117. AND gate 118 is connected to present an operating signal to diode 105 upon receipt of an operating signal from $A_2$ at diode 119, $T'_1$ ($T_1$ in a false condition) at diode 120, $T'_5$ at diode 121 and C at resistor 122. AND gate 123 is connected to present an operating signal to diode 107 upon receipt of an operating signal from $B'_6$ ($B_6$ in a false condition) at diode 124, T' at diode 125 and C at resistor 126. AND gate 127 is connected to present an operating signal to diode 108 upon receipt of an operating signal from $B'_6$ at diode 128, $T_5$ at diode 129, and C at resistor 130. AND gate 131 is connected to present an operating signal to diode 109 upon receipt of an operating signal from $A'_2$ at diode 132, $T'_1$ at diode 133, $T'_5$ at diode 134, and C at resistor 135. Thus it is readily seen that flip flop $A_1$ receives signal ${}_1a_1$ at point 17 (which sets $A_1$ to a true condition) when $B_6$, $T_1$, and C provide a signal to AND gate 110; or when $B_6$, $T_5$, and C provide a signal to AND gate 114; or when $A_2$, $T'_1$, $T'_5$, and C provide a signal to AND gate 118. OR gate 102 provides a signal to point 17 upon receipt of a signal from any of AND gates 110, 114, and 118. It is again readily apparent that $A_1$ receives a signal ${}_0a_1$ at point 22 which sets $A_1$ to a false condition ($A'_1$) when OR gate 106 receives a signal from any one of AND gates 123, 127, and 131. The circuitry of FIG. 4 shows the mechanization of the logical equations for flip flop $A_1$ for illustration purposes. Complete circuitry for the mechanization of the other flip flops used in the invention will not be shown. Circuitry design according to FIG. 4 and well-known in the art may be utilized to mechanize any of the logical equations to be used in the device of this invention.

Turning now to FIG. 5 there is shown in schematic the flip flop circuitry of the A, B, and C registers of storage device 1. Each register comprises 7 flip flops and a storage channel on magnetic disc 9 shown in FIG. 2 which comprise the complete storage register which stores the information during the process of taking the square root. The A, B, and C registers are recirculating or shift registers and operate in a like manner. For simplification purposes only, the B register will be described since the A and C registers are constructed in a like manner. The B register comprises channel 11 which is a part of magnetic disc 9 and flip flops $B_1$, $B_2$, $B_3$, $B_4$, $B_5$, $B_6$, and $B_7$. It will be assumed for purposes of illustration only that channel 11 is not storing any bits. Since each of the flip flops store a binary bit, it is readily seen that the register stores a total of 7 bits. It is to be noted that channel 11 may readily be designed to store any number of digits limited only by the physical design limitations of magnetic disc 9. As previously noted in the description of FIG. 2, B channel 11 located on disc 9 of FIG. 2 is continuously moving in a direction so as to shift a digit of binary information through the read head and read amplifier described in FIG. 2 to the $B_7$ flip flop. Also as previously described in FIG. 2, the $B_1$ flip flop feeds a digital bit of information into the A channel at each clock pulse. Flip flop $B_7$ copies a digital bit of binary information from the B channel at each bit time determined by the clock pulses from clock channel 10 shown in FIG. 2. Also at each bit time flip flop $B_7$ feeds an output signal indicative of a binary digit stored therein into flip flop $B_6$ which in turn does the same in relation to flip flop $B_5$. Flip flop $B_5$ feeds the binary information stored in it to flip flop $B_4$. This process continues through flip flops $B_3$, $B_2$, and $B_1$ which writes the digital information into channel 11. Thus it can be seen that a binary number comprising several digits which may be stored in the B register is continuously recirculating or reshifting. For example, assume the binary number 1001 is stored in the B register. Also assume initially that a number is stored in disc 9 so that at time $T_1$ the least significant digit is read from disc 9 into flip flop $B_7$. Since the digit 1 represents a truth signal in the binary logic described previously for this invention, flip flop $B_7$ receives an input denoted by ${}_1b_7$ at its input terminal 25. If flip flop $B_7$ was previously in the true condition with output terminal 26 emitting a truth or 1 signal, the condition of the flip flop remains unchanged. If flip flop $B_7$, however, was in the false condition with $B'_7$ emitting a truth signal at output terminal 27 and output terminal 26 emitting a false signal, the flip flop changes states in response to the trigger signal ${}_1b_7$ at input terminal 25. Flip Flop $B_7$ now is in the condition wherein the state of output terminal 26 is true or 1 and the state of output terminal 27 is false or 0. The binary condition of $B_7$ is now in the truth or 1 condition which simply means that flip flop $B_7$ is now storing binary digit 1. At bit time $T_2$, the second significant bit of binary number 1001 which has shifted one bit time in disc 9 is now presented to the input of flip flop $B_7$. Since 0 is a false condition, input terminal 28 of flip flop $B_7$ receives a signal denoted as ${}_0b_7$. Flip flop $B_7$ which was previously in binary condition 1 now changes condition in response to the signal at terminal 28 and the state of output terminal 26 is false or 0 and the state of output terminal 27 is true or 1. Flip flop $B_7$ is now in binary condition 0. Also at time $T_2$ flip flop $B_7$ which stored binary condition 1 at time $T_1$ presents an input to flip flop $B_6$ at input terminal 29. Since $B_7$ stored binary condition 1, the input to terminal 29 is a true or ${}_1b_6$ signal. Flip flop $B_6$ in response to the signal at input terminal 29 changes to the binary condition 1 in the same manner described for flip flop $B_7$ output terminal 30 in a true condition and output terminal 31 in a false condition. $B_6$ now stores binary digit 1 which is the least significant digit of the binary example number 1001. At the end of time $T_2$ with flip flop $B_6$ storing least significant digit 1 and flip flop $B_7$ storing the second least significant digit 0, it is readily seen that a process of shifting is going on in the B register with binary number 1001 being shifted one part to the right at each bit time determined by the clock pulse from channel 10 on disc 9 in FIG. 2. This recirculation or shifting process continues with one bit being shifted at each clock timing signal. Logical circuitry interposed between the flip flops not shown in FIG. 5 and to be described later modifies the circulation. Storage registers A and C in FIG. 5 are constructed in the same manner as register B and operate identically to register B, shifting or recirculating the binary number stored therein.

In order to perform the square root operation in the device of this invention, timing control must be provided for the various functions described herein. FIG. 6 shows a schematic diagram of the timing control provided in the square root computation. Origin channel register 31 which is a single pulse located on the origin channel of magnetic disc 9 provides the initial timing signal. The pulse located at a fixed position on disc 9 provides a signal to read head 32 which is connected to the input of AND gate 33. AND gate 33 also receives a signal from clock channel 9 and command control 3 and produces an output to origin flip flop 34, known as the $X_0$ flip flop. Origin flip flop $X_0$ presents a truth or 1 signal at its output each time magnetic disc 9 makes a complete revolution. Flip flop $X_0$ is turned on upon receipt of a pulse from origin channel 31 for one bit time and is turned off the next bit time by itself. Thus, the logical equation for flip flop $X_0$ is:

$$X_0: {}_1X_0 = X_rC$$
$${}_0X_0 = X_0C$$

Clock channel 10 as previously noted provides a pulse signal for each bit time to AND gate 33 and the A, B, and C registers, in addition to logical control 5 circuitry. The length of time of bit is thus determined by the spaced time between pulses emitted by clock channel 10. As previously noted, every flip flop in the circuitry of this invention has associated with its input an AND gate which receives a clock pulse from clock channel 10 in addition to other inputs to control the timing of the flip flop operations. In order to identify each of the bits within a given word stored in one of the registers of storage device 1, a binary digit count is required which functions to provide appropriate signals for control and arithmetic operations. In addition, bit time flip flops 35 are provided to describe the special bit times which are utilized in the numerous control and arithmetic functions in the computer's logic. Special flip flops are provided in bit time flip flops 35 which provide signals at special bit times. Also required in the computer system are signals describing the word times of the operation. A word time is used in this invention to describe the number of bit times for a given operation and may be equal to the number of bit times, in which a complete circulation has been completed in the registers of storage device 1. As used in this invention, the word time is equal to the number of bits stored in each of the registers minus 2. For example, if the B channel on the disc 9 is assumed to be storing no bits and the 7 flip flops of B each store a bit, one word time would equal 5 bit times. Thus if a 7 bit time word was stored in storage register A, it would take one word time plus 2 bit times or 7 bit times for each bit of the number to pass through a single flip flop in the A register. Associated with word time counter 36 is word time flip flop 37 which consists of a number of special flip flops which in response to word time counter 36 create special signals denoting special word times required in the square root operation.

FIG. 7 shows in detail the operation of bit time counter 34 and word time counter 36 and the associated timing flip flops. AND gates enclose the letter A and OR gates enclose 0. Bit time counter 34 comprises flip flops $D_1$, $D_2$, and $D_3$ which form a three-stage binary counter. A three-stage counter is shown for explanation purposes only and it is to be noted that any number of stages may be utilized. The only requirement for the number of stages of bit time counter 34 is that it has the ability to count the number of bits which comprise the registers of storage device 3. The three-stage counter shown in FIG. 7 will count 5 bits which is equal to the number of bits shown in the example for the B register in FIG. 2 minus 2. The counter is set to count bit 1 by the origin flip flop $X_0$. From then on the counter counts one more bit each time a pulse is received from clock channel 10. The counter is a standard binary counter well-known in the art with a few modifications to meet the particular application of this invention. Ordinarily in a three-stage counter after counting up to 5, the counter will be set to 6 by the next pulse. Instead of being set to 6, the digit counter in FIG. 7 must change from 5 to 1. This change is provided by feeding the output of flip flop $T_5$ to flip flops $D_1$, $D_2$, and $D_3$ in a manner to provide the necessary output. Logical equations for digit time counter 34 are as follows:

$$D_1: {}_1d_1 = D'_1C + X_0C$$
$${}_0d_1 = X'_0D_1T'_5C$$
$$D_2: {}_1d_2 = D'_2D_1T'_5X_0'C$$
$${}_0d_2 = D_2D_1C + X_0C$$
$$D_3: {}_1d_3 = D'_3D_2D_1X'_0C$$
$${}_0d_3 = X_0C + T_5C$$

Particular counters required of bit counter 34 are provided by timing flip flops comprising flip flops $T_1$, $T_2$, $T_4$, and $T_5$ which create signals denoting the first two of the last two bits of each word time. Flip flops $T_1$, $T_2$, $T_4$, and $T_5$ are responsive to flip flops $D_1$ through $D_3$ bit counter 34. Flip flops $T_5$, $T_2$, and $T_1$ are each turned on by the previous T flip flops and immediately reset themselves to 0. Flip flop $T_4$ is turned on by flip flops $D_2$ and $D_1$ of digit counter 34. Logical equations for the special digit timing flip flops are as follows:

$$T_1{:}\,{}_1T_1=T_5C \qquad T_4{:}\,{}_1T_4=P_2P_1C$$
$$\quad {}_0T_1=T_1C \qquad \quad {}_0T_4=T_4C$$
$$T_2{:}\,{}_1T_2=T_1C \qquad T_5{:}\,{}_1T_5=T_4C$$
$$\quad {}_0T_2=T_2C \qquad \quad {}_0T_5=T_5C$$

Thus in operation during a complete counting cycle of digit counter 34, as illustrated in FIG. 7, the counter is set to count bit 1 by the origin flip flop $X_0$. Flip flop $D_1$, receiving an output signal from flip flop $X_0$ (in its true condition) through an OR gate, will be set to a true condition. Flip flops $D_2$ and $D_3$, receiving an input signal from flip flop $X_0$ (in its true condition) through associated AND and OR gates, will be set to false conditions. Counter 34 is now counting binary 1. The next (second) pulse received from clock channel 9 in association with the flip flops shown in FIG. 7 sets flip flop $D_1$ to a false condition (input ${}_0d_1$ receiving an input signal from output $D_1$ of flip flop $D_1$); flip flop $D_2$ is set to a true condition (input ${}_1d_2$ receiving an input signal from output $D_1$ of flip flop $D_1$); and flip flop $D_3$ remains in its false condition. Upon receipt of the third pulse from clock channel 9, flip flop $D_1$ is set to a true condition (input ${}_1d_1$ receiving a signal from output $D'_1$); flip flop $D_2$ remains in its true condition; and flip flop $D_3$ remains in its false condition. Upon receipt of the fourth pulse from clock channel 9, flip flop $D_1$ is set to a false condition (input ${}_0d_1$ receiving a signal from output $D_1$); flip flop $D_2$ is set to a false condition (input ${}_0d_2$ receiving a signal from outputs $D_2$ and $D_1$); and flip flop $D_3$ is set to a true condition (input ${}_1d_3$ receiving a signal from the outputs $D_1$, $D_2$, $D'_3$ and $X'_0$). Upon receipt of the fifth pulse from clock 9, flip flop $D_1$ is set to a true condition (input ${}_1d_1$ receiving a signal from output $D'_1$); flip flop $D_2$ remains in its false condition and flip flop $D_3$ remains in its true condition. Upon receipt of the sixth pulse from channel 9, flip flop $D_1$ remains in its true condition; flip flop $D_2$ remains in its false condition; and flip flop $D_3$ is set to a false condition (input ${}_0d_3$ receiving a signal from $T_5$).

Also shown in FIG. 7 are the flip flops which comprise word time counter 36. Flip flops $U_1$, $U_2$, and $U_3$ form a binary counter which counts 6 in response to clock channels being turned on by the origin flip flop $X_0$ in a similar manner described for bit time counter 34. Word time counter 36 is initially turned on by the coincidence of a clock pulse and a signal from the origin flip flop. Flip flop $U_1$ is set to count 1 in response to a signal from flip flop $T_5$. In other words the five bit times of each word stored in flip flop $T_5$ turns on flip flop $U_1$ which, together with flip flops $U_2$ and $U_3$, forms a binary counter counting up to 6 in a manner similar to that described for bit time counter 34. Logical equations for word time counter 36 are as follows:

$$U_1{:}\,{}_1U_1=U'_1T_5C+X_0C$$
$$\quad {}_0U_1=X'_0U_1T_5C$$
$$U_2{:}\,{}_1U_2=U'_2U_1T_5C$$
$$\quad {}_0U_2=U_2U_1T_5C+X_0C+W_6T_5C$$
$$U_3{:}\,{}_1U_3=U'_3U_2U_1T_5C$$
$$\quad {}_0U_3=X_0C+W_5T_5C$$

Thus in operation during a complete counting cycle of word counter 36, as illustrated in FIG. 7, the counter is initially set to count word 1 by original flip flop $X_0$. From then on flip flop $U_1$ is set to a true condition in response to a signal from flip flop $T_5$. Thus upon receipt of the first pulse from $X_0$ or $T_5$, flip flop $U_1$ is set to a true condition; flip flops $U_2$ and $U_3$ are set to a false condition (input ${}_0U_2$ and ${}_0U_3$ receiving signals from $X_0$). At the second clock pulse, $U_1$ is set to a false condition (input ${}_0U_1$ receiving a signal from $U_1$); $U_2$ is set to a true condition (input ${}_1U_2$ receiving a signal from $U'_2U_1T_5$); and $U_3$ remains in a false condition. At the third clock pulse, $U_1$ is set to a true condition (input ${}_1U_1$ receiving a signal from $U'_1T_5$); $U_2$ remains in a true condition and $U_3$ remains in a false condition. At the fourth clock pulse, $U_1$ is set to a false condition (input ${}_0U_1$ receiving a signal from $U_1$); $U_2$ is set to a false condition (input ${}_0U_2$ receiving a signal from $U_2U_1T_5$); and $U_3$ is set to a true condition (input ${}_1U_3$ receiving a signal from $U'_3U_2U_1T_5$). At the fifth clock pulse, $U_1$ is set to a true condition (input ${}_1U_1$ receiving a signal from $U'_1T_5$); $U_2$ remains in a false condition; and $U_3$ remains in a true condition. At the sixth clock pulse $U_1$ is set to a false condition (input ${}_0U_1$ receiving a signal from $U_1$); $U_2$ is set to a true condition (input ${}_1U_2$ receiving a signal from $U'_2U_1T_5$); and $U_3$ remains in a true condition. At the seventh pulse $U_1$ is set to a true condition, $U_2$ is set to a false condition and $U_3$ is set to a false condition indicating a count of one word again and the cycle commences again.

Flip flops $W_1$, $W_2$, $W_5$, and $W_6$ associated with flip flops $U_1$ through $U_3$ provide special word timing signals to the computer. Flip flops $W_1$ and $W_2$ provide signals indicating the first two word times and flip flops $W_5$ and $W_6$ provide signals denoting the last two word times. The logical equations for the word timing flip flops are as follows:

$$W_1{:}\,{}_1W_1=W_6C \qquad W_5{:}\,{}_1W_5=U_2U'_1C$$
$$\quad {}_0W_1=W_1C \qquad \quad {}_0W_5=W_5C$$
$$W_2{:}\,{}_1W_2=W_1C \qquad W_6{:}\,{}_1W_6=W_5C$$
$$\quad {}_0W_2=W_2C \qquad \quad {}_0W_6=W_6C$$

Thus far in the description of the square root computer of this invention the various components and functions have been shown and described. No attempt has been made to describe the actual functions of these components.

Turning now to FIG. 8, a block diagram is shown of the flip flops of the A, B, and C registers, which together with the logical circuitry associated therewith, performs the square root function. No attempt will be made to show the electronic circuitry for the operation of the flip flops with the logical circuitry associated therewith nor the circuitry previously described which provides for the recirculation of the flip flops in the A, B, and C registers. In FIG. 8 there is shown the flip flop storage devices of the A, B, and C registers arranged in a plurality of horizontal rows representative of the bit and word times of the operation of the computer in the process of extracting the square root. The order of significance of the digits in FIG. 8 is assumed to be from left to right with $A_7$, for example, storing the most significant digit and $A_1$ storing the least significant digit. The magnetic storage channels for the A, B, and C registers are not shown for simplification purposes. In the operation it takes one bit time for each of the recirculating registers A, B, and C to shift information stored therein one bit to the right. It takes one word time (5 bit times) for the registers to recirculate one complete cycle. In the square root computation during the first word time (rows 79 to 81) the operand, stored in the A register by means not a part of this invention, is shifted to the B register. The two most significant digits of the operand are transferred from the B register to $A_1$ during the last bit time of each word time and the first bit time of the next word time. The increment $h_1$, which is always "1," is inserted in flip flop $C_1$ by means of logical circuitry during the last bit time of each word time. Four other bits, associated with $h_1$, are transferred into $C_1$ during word time $T_2$. During word time $T_2$ and the subsequent word times of operation, the number in $C_1$ is subtracted from or added to the operand stored in $A_1$ with the result representing the remainder $A_1$ which is stored in $A_7$ by means of logical control. To determine the number to be subtracted from or added to the remainder for the second and suceeding steps in accordance with the Equations 8 and 9 developed in the previous discussion on the theory of the method, logical control is provided to modify the recirculation in the C register so that at the beginning of each step of operation a number is stored in $C_1$. The remainder at the end of each step is recirculated from $A_7$ to $A_1$ where it becomes the operand for the next step. One step of operation is completed in one word time and one bit of the partial root developed during each word time is stored by logical control in $C_7$ during the first bit time of each word time. The square root process continues for a number of word times equal to the number of digits in the initial operand with the partial root being built up in the C register one digit for each word time. During the last word time the root is shifted from C to A by logical control.

As shown in FIG. 8 the first function described occurs in word time $W_1$ comprising row 79 denoting bit time $T_1$, row 80 denoting $T_2$ to $T_{L-1}$, and row 81 denoting the last bit time $T_L$. Similarly, word time $W_2$ comprises rows 42–46, word time $W_3$ comprises row 47, word time $W_{L-1}$ comprises row 48, and the last word time $W_L$ comprises row 49. The flow of information which is passed from one flip flop to another in the A, B, and C registers will be shown in FIG. 8 by arrows. It is to be noted that these arrows in no way comprise electrical circuitry, but are shown to denote the functional operation only of the flip flops. An arrow between one flip flop and another means that the information stored in the first flip flop at a given bit time $T_n$ is transferred to the second flip flop so as to be stored in that flip flop at the next bit time $T_{n+1}$. Arrows will also be shown to the various flip flops denoting information received from the logical circuitry of the information which is obviously not shown in FIG. 8. The flip flops of the A, B, and C registers stored in horizontal column 79 of FIG. 8 are storing certain information at time $T_1$ of $W_1$. This information is transferred to the other flip flops functionally by the arrows shown. Thus, for example, the flip flops in horizontal column 80 at bit time $T_2$ represent the corresponding flip flops of horizontal row 79 at bit time $T_1$.

Turning now to the functional operation of the A, B, and C registers shown in FIG. 8, it will be assumed that at bit time $T_1$ of word time $W_1$, the number from which the square root is to be extracted, called the operand, is stored in the A register. Thus, for example, a four-digit binary number may be stored in flip flops 1, 2, 3, and 4 of the A register. This is shown in horizontal row 79. It will be assumed initially that the B and C registers are cleared, not storing any information. During word time $W_1$ the operand is transferred from the A register to the B register. In the A register, between time $T_1$ and time $T_2$, information stored in the flip flops of row 79 is transferred to the flip flops of row 80 and shifted one bit time to the right in accordance with the recirculation function of the A register previously described. Thus, for example, the information in flip flop $A_2$ is transferred to flip flop $A_1$ between times $T_1$ and $T_2$ as denoted by arrow 58. Other arrows show a similar transferring of information from the flip flops of A register in time $T_1$ to time $T_L$. Flip flop $A_1$ transfers its information to flip flop $B_7$ each bit time of word time $W_1$ in accordance with control from logical circuitry. This is shown by arrow 52. The flip flops of the B register likewie shift the binary digit stored to each bit time flip flop $B_7$ to the right one bit, as, for example, shown by arrow 53. Thus, it can be seen that at the last bit time of word time $W_1$ denoted by row 81 the binary number stored in the A register is now stored in the B register. For example, a binary number comprising four digits stored in flip flops 1–4 of the A register is now stored in flip flops 7, 6, 5, and 4 of B register. The number of bit times consumed in word time $W_1$ to transfer the binary number from the A to the B register depends on the number of digits in the binary number. Taking, for example, a four-digit number, 4 bit times will be consumed in transferring binary number from the A register to the B register.

At the last bit time of $W_1$ which is row 81 and the first bit time of word time $W_2$ denoted as row 42, two bits are shifted from the B register into the right hand bit position of the A register. Thus during bit time $T_L$ of word time $W_1$, information stored in $B_6$ is transferred to $A_1$ by arrow 54 and during bit time $T_1$ of word time $W_2$ the information stored in $B_6$ is transferred to $A_1$ shown by arrow 50. The two bits of information passed by arrows 54 and 50 represent the two next parts of the operand not yet operated on. Functionally, in taking the square root of the operand the first two bits starting from the most significant digit from the left are operated on during the first operation. In this case the operand stored in B register has its two most significant digits stored in $B_7$ and $B_6$. These two digits are transferred to the $A_1$ flip flop at times $T_L$ of $W_1$ and $T_1$ of $W_2$. At the last bit time $T_L$ of $W_1$, information is inserted into $C_1$ which indicates the first number to be subtracted from the operand in order to obtain the first remainder in the first step of operation. As noted in the introduction to the description of the invention, the first number to be subtracted from the operand to obtain the first remainder is always the increment denoted by the pair of bits 01 which are subtracted from the two most significant digits of the operand. Thus, at time $T_1$ of $W_2$ information is stored in $C_1$ denoting the bit 1 which represents the least significant digit of the first increment to be subtracted from the operand to obtain the first remainder. The information transferred to $C_1$ at $T_1$ of $W_2$ is received from logical circuitry not shown and fed through arrow 51 to $C_1$.

Thus far at $T_1$ of word time $W_2$ the operand stored in the B register has its first bit stored in $A_1$ of the A register. The first bit to be subtracted from the operand is stored in $C_1$ of the C register. Turning now to the second part of the square root process which comprises the operation of extracting the square root, basically the A, B, and C registers combine with logical circuitry designed in accordance with Equations 8 and 9, developed in prior discussion, to extract the square root from the operand storing it in the C register. As pointed out previously, the first increment to be subtracted from the operand in the first step of the operation has its least significant digit stored in $C_1$ at time $T_1$ of $W_2$. The bit of the operand which is to be operated on by the bit stored in $C_1$ is stored in $A_1$. The contents of $C_1$ are subtracted from the contents of $A_1$ and the difference is entered into $A_7$. Thus, as shown in FIG. 8, the information stored in $C_1$ at time $T_1$ of word time $W_2$ is subtracted from the information stored in $A_1$ in time $T_1$ and the difference is stored in $A_7$ at time $T_2$. At time $T_1$ of word time $W_2$ a 0 signal is introduced by logic into $C_1$ through arrow 35. This 0 bit is indicative of the predetermined most significant part of the increment to be subtracted from the operand in the first step of the square root operation. At time $T_2$ of word time $W_2$, $C_1$ is again subtracted from $A_1$, the answer being stored in $A_7$ at time $T_3$. This process continues through word time $W_2$ until the last bit time $T_L$ of word time $W_2$ when contents of $C_1$ are subtracted from or added to the contents of $A_1$ and stored in $A_7$ at time $T_1$ of word time $W_3$. The answer to the subtraction or addition of $C_1$ from $A_1$ at the last bit time of word time $W_2$ is indicative of the sign of the answer. From principles of binary addition and subtraction well-known in the art it can readily be seen that if the answer to the subtraction or addition of $C_1$ from $A_1$ at time $T_L$ of word time $W_2$ is a truth or 1 digit, the sign is minus, and if a 0 digit, the sign is plus. During word time $W_2$, $C_1$ is always subtracted from $A_1$. For the other word times in the operation, $C_1$ is subtracted from $A_1$ if the answer to the operation $C_1$ and $A_1$ at the last bit of the previous word time is 0 and $C_1$ is added to $A_1$ if the answer is 1. The subtraction or addition of $C_1$ from $A_1$ continues in row 45 which is indicative of time $T_3$ to time $T_{L-1}$. Row 45 therefore is indicative of all of the bit times up until the last bit time and is shown as one row for simplification since the operation is the same for each bit time up to the last bit time. The remainder stored in $A_7$ is recirculated in the A register during word time $W_2$ except that the $A_7$ flip flop is prevented from copying the $A_1$ flip flop. Thus the remainder stored in $A_7$ is shifted to the right one bit for each bit time as shown by arrows 55.

Thus far in the operation of extracting the square root, a predetermined increment has been used to provide a remainder during the first step in the operation. From here on in the operation the number to be subtracted from the remainder at each step is determined by the Equations 8 and 9 which were derived earlier in the discussion of this invention. Equation 8 is utilized to provide logical control to produce a partial root during each step of operation in $C_1$ when the answer to the last subtraction or addition performed by $C_1$, and $A_1$ is minus and Equation 9 is used if the answer is plus. During word time $W_2$, the B register recirculates causing a left shift of two parts for each word time, thus the bit stored in $B_5$ and $B_4$ at time $T_L$ of word time $W_1$ are stored in $B_7$ and $B_6$ respectively at time $T_L$ of word time $W_2$ as denoted by arrows 56 in FIG. 8. Thus it can be seen that from the circulation path provided by arrows 54 and 50, the B register shifts the operand 2 bits to the left at each word time and feeds the 2 bits stored in $B_7$ and $B_6$, which are the next two bits of the operand not operated on, into $A_1$ of the A register, where they are appended to the low end of the remainder and serve as part of the operand for the next step. During word time $W_2$ the contents of the C register are recirculated similar to the manner described for the B register with some significant changes. It has already been noted that C, during the first and second bit times of word time $W_2$, receives input signals from logical control of the invention. During time $T_1$ of word time $W_2$ the contents of $C_2$ are shifted to $C_7$ as noted by arrow 57. At time $T_2$ contents of $C_7$ are shifted one position to the right and to $C_6$ as denoted by arrow 58, and at time $T_3$ the contents of $C_6$ are shifted one place to the right at $C_5$ and also to $C_1$ as shown by arrows 59 and 60 respectively. In this manner, a partial root is continuously being stored and shifted in the C register. Turning now to word time $W_3$ operation of the A, B, and C registers functions as described in relation to word time $W_2$ with the following significant differences. As described above, the information stored in $C_1$ during time $T_1$ of word time $W_2$ also indicative of the binary bit 1 which is always used in the first step of a square root of operation. During word time $W_3$ and all subsequent word times of operation, information is inserted in $C_1$ during times $T_1$ and $T_2$ which is received from the logical control circuitry and is indicative of the answer to the Equations 8 and 9 previously described in the square root operation. In the process of solving Equations 8 or 9 it has been found that the least significant digit to be subtracted from the operand is always equal to 1, so a 1 signal is set into $C_1$ at word time $W_3$ and all subsequent times as shown by arrow 61. The information stored in $C_1$ at $T_2$of word time $W_3$ is derived from the logical control. During word time $W_2$ at the last bit time $T_L$, if the answer to the subtraction or addition of $C_1$ from $A_1$ is a 1 signal indicating a negative number, a 0 signal is inserted by logical control into $C_7$ at time $T_1$ of word time $W_3$ shown by arrow 62. This signal represents one bit of the partial root. During each word time the partial root is augmented by two bits fed to $C_1$ being stored at time $T_1$ and $T_2$ of the word time. $C_1$ recirculates as previously described, thereby storing a new bit of the partial root at the end of each step in the operation of the square root. At the last bit time of all the word times a 0 signal is fed to $B_7$ in order to clear the B register. At the word time $W_{L-1}$ which is determined by the number of bits of the operand the complete square root is stored in the C register at time $T_L$ shown at row 48. At the last word time $W_L$ through logical circuitry, the square root stored in row 48 of the C register is transferred to the A register where it appears in usable form in the last bit time $T_L$ of the last word time $W_L$ as denoted by row 49.

The number of bit times of operation will be equal to the number of bits stored in the A, B, and C registers.

In the example of FIG. 8 for purposes of explanation, it was assumed that the A, B, and C registers stored 7 bits of information, therefore during each word time of the operation in FIG. 7 there will be 7−2 or 5 bit times. The number of word times of operation between the first word time when the operand is merely shifted to the B register and the last word time when it is shifted to the A register, is dependent on the number of digits in the operand to be operated on. This, for example, if it is used to take the square root of a binary number 0001, one word time would be used to transfer the number from the A to the B register and 4 word times would be used to extract the square root and 1 word time would be used to transfer the answer from the C register to the A register. The total word times consumed in the operation of the square root of a binary number of four digits would be 6.

Turning now to FIG. 9 there is shown in schematic diagram the logical circuitry necessary to perform the addition or subtraction of the information stored in flip flop $C_1$ in the C register from the information stored in flip flop $A_1$ of the A register as described above in relation to FIG. 7. The circuity of FIG. 9 provides for serial addition or subtraction of the information stored in flip flops $A_1$ and $C_1$. In other words, the bit stored in $C_1$ at a particular bit time is added to or subtracted from a bit stored in $A_1$ at a particular time. In this manner a binary number is added to or subtracted from a binary number by adding or subtracting one bit position at a time starting from the least significant end and working on up towards the most significant end, each time recording the sum bit in flip flop $A_7$ and temporarily storing the carry bit in flip flop $K_a$ for use at the next bit time. If $A_1$ is to be added to $C_1$ the circuitry of FIG. 9 operates in a manner which is analogous to the pencil and paper method of addition. In order to operate both as an adder and as a subtractor, the circuitry of FIG. 9 must be designed so that the bit in $C_1$ is subtracted from the bit in $A_1$ upon receipt of a logical signal. Flip flop $E_0$ in response to the answer of the addition or subtraction of $C_1$ from $A_1$ at the last bit time of the previous word time provides a logical control signal into flip flop $K_A$ which determines whether $C_1$ is to be subtracted from or added to $A_1$.

The question of whether to perform addition or subtraction depends upon the sign of the remainder of the previous step. Addition of $A_1$ and $C_1$ for a given word time is indicated if result of the addition or subtraction of $A_1$ and $C_1$ at $T_5$ of the previous word time is a negative number indicated by a "1" stored in $A_7$ at $T_1$. If the result is a positive number indicated by a "0," then subtraction is indicated. The $E_0$ flip flop is used as the controlling means for setting the $K_a$ flip flop which in turn determines whether addition or subtraction is being accomplished. $E_0$ response to the $A_1$, $C_1$, and $K_a$ flip flops at the last bit time of each word time is in the true or "1" condition if addition is indicated, and is in the false or "0" condition if subtraction is indicated. Logical equations for the $A_1$, $K_a$, and $E_0$ flip flops which perform the addition or subtraction are as follows:

$$A_7: {}_1A_7 = A'_1C'_1K_aC + A'_1C_1K_aC + A_1C'_1K'_aC + A_1C_1K_aC$$

$${}_0A_7 = A'_1C'_1K'_aC + A'_1C_1K_aC + A_1C'_1K_aC + A_1C_1K'_aC + U_1C$$

$$K_a: {}_1K_a = E_0A_1C_1T'_5C + E'_0A_1C_1T'_5C$$

$${}_0k_a = E_0A'_1C'_1C + E'_0A_1C'_1C + T_5C$$

$$E_0: {}_1e_0 = A'_1K_aU'_1T_5C$$

$${}_0e_0 = U_1C + A_1K_aT_5C$$

Assume for the purposes of explanation that it is desired to subtract the operand 01 (stored in $C_1$) from the operand 00 (stored in $A_1$). At the first bit time the bit 1 is stored in $C_1$ and the bit 0 is stored in $A_1$. Thus flip flop $C_1$ is in a true condition producing an output signal and flip flop $A_1$ is in a false condition producing an output signal $A'_1$. Flip flop $A_7$ receives an input signal at its input ${}_1A_7$ from flip flop $A_1$ (in its false condition $A'_1$), flip flop $C_1$ (in its true condition $C_1$), and flip flop $K_a$ (which is in its false condition $K'_a$ which had previously been set to the false condition for subtraction by the signal $E'_0A_1C'_1$). $A_7$ is set to a true condition at the second bit time. Thus $A_7$ is now storing binary 1. At the first bit time carry flip flop $K_a$ is set to a true condition (input ${}_1k_a$ receiving the signal $A'_1C_1$). At the second bit time the bit 0 is stored in $C_1$ and the bit 0 is stored in $A_1$. Flip flop A) now receives a signal indicative of $A'_1C'_1K_a$ which sets $A_7$ to a true condition. Thus when subtracting the number 01 (stored in $C_1$) from the number 00 (stored in $A_1$) there is obtained the number 11 (stored in $A_7$).

The relation between the logical equations and the circuitry of FIG. 9 is deemed to be obvious to a man skilled in the computer art who has read the previous discussion of this application as to the specific terms used in the logical equations. Thus it can be seen from FIG. 9 that the bit stored in $C_1$ is subtracted from the bit stored in $A_1$ if the signal from flip flop $E_0$ indicates that the answer to the previous operation was positive and $C_1$ is added to $A_1$ if the answer to the previous operation was negative.

Turning now to FIG. 10 there is shown a schematic diagram of the mechanization of the logical equation switch whereby the necessary shifting and relation between the A, B, and C registers to perform the square root operation in accordance with the functional description already noted hereinbefore. The circuitry of the adder of FIG. 9 is not included, but shown in block form only.

In FIG. 10 there is shown a schematic diagram showing the circuitry provided by logical control to control the shifting of the A, B, and C registers in addition to providing necessary logical information to the registers. The necessary AND gates before each input to a flip flop which pass a signal only upon coincidence of the signal with a clock signal are not shown for simplicity of explanation. For explanation purposes, each of the registers A, B, and C are assumed to have seven storage flip flops only, for storage. The parts of disc 9 which has the A, B, and C channels available for storage of additional bits is not shown for simplicity of explanation.

In the A register of FIG. 10 during the first word time $W_1$, the A register is cleared by feeding a signal from the $U_1$ flip flop to the $A_7$ flip flop to set $A_7$ in the false or "0" condition. The remainder of the flip flops copy their previous flip flop during $W_1$ thereby clearing the A register. During the last bit time $T_5$ of $W_1$ and the first bit time $T_1$ of word time $W_2$, $A_1$ copies $B_6$ which contained the next two bits of the operand to be operated on. During $W_2$ through the next to last word time $W_5$, $A_1$ supplies one input to the adder and $A_7$ receives the output of the adder. During $W_2$ through $W_5$ the rest of the A flip flops recirculate. At the last word time $W_6$, $A_5$ copies the square root from $C_7$. The complete logical equations for the A register are as follows:

$$A_1: {}_1a_1=T'_1T'_5A_2C+B_6T_5C+B_6T_1C$$
$${}_0a_1=T'_5T'_1A'_2C+B'_6T_5C+B'_6T_1C$$
$$A_2: {}_1a_2=A_3C$$
$${}_0a_2=A'_3C$$
$$A_3: {}_1a_3=A_4C$$
$${}_0a_3=A'_4C$$
$$A_4: {}_1a_4=A_5C$$
$${}_0a_4=A'_5C$$
$$A_5: {}_1a_5=A_6U'C+U_6T'_5C_7C$$
$${}_0a_5=A'_6U'_6C+U_6T'_5C'_7C$$
$$A_6: {}_1a_6=A_7C$$
$${}_0a_6=A'_7C$$
$$A_7: {}_1a_7=A'_1C'_1K_aC+A'_1C_1K_aC+A_1C'_1K'_aC+A_1C_1K_aC$$
$${}_0a_7=A'_1C'_1K'_aC+A'_1C_1K_aC+A_1C'_1K_aC+A_1C_1K'_aC+U_1C$$

In the B register of FIG. 10 during the first word time $W_1$, B copies the operand stored in the A register and recirculates the operand with the two most significant digits placed in $B_7$ and $B_6$ at $T_5$. At $T_5$ of $W_1$ and $T_1$ of $W_2$, $B_6$ finds the two next bits of the operand into $A_1$ as previously described. During word time $W_2$ through $W_5$, B recirculates so that the next two leading bits of the operand will be positioned in $B_7$ and $B_6$ during $T_5$ of each word time. The logical equations for the B register as follows:

$$B_1: {}_1b_1=B_2C$$
$${}_0b_1=B'_2C$$
$$B_2: {}_1b_2=B_3C$$
$${}_0b_2=B'_3C$$
$$B_3: {}_1b_3={}_4C$$
$${}_0b_3=B'_4C$$
$$B_4: {}_1b_4=B_5C$$
$${}_0b_4=B'_5C$$
$$B_5: {}_1b_5=B_6C$$
$${}_0b_5=B'_6C$$
$$B_6: {}_1b_6=B_7C$$
$${}_0b_6=B'_7C$$
$$B_7: {}_1b_7=T'_5U'_1B_1C+U_1T'_5A_1C$$
$${}_0b_7=T_5C+T'_5U_1A'_1C+U'_1T'_5B'_1C$$

The C register as shown in FIG. 10 is cleared during the first word time by feeding a signal from the $U_1$ flip flop to the $C_7$ flip flop to set $C_7$ in the false or "0" condition. Each of the remaining flip flops copy its previous flip flops during $W_1$ thereby clearing the C register with all of the flip flops in the "0" condition at $T_5$ of $W_1$. During $T_1$ of each word time subsequent to $W_1$, a "1" is inserted into $C_1$. This "1" represents the lower bit of the increment $h_1$ which is always tried as a "next" bit in the operation to develop $R_1$ (partial root). Therefore, $R_1$ is always 1 at $T_1$ during the process of taking the square root. At $T_2$ of the $W_2$ and subsequent word times $C_7$ which contains the next root bit $R_1$ is set by logic control to "1" if the remainder at the end of the previous step is negative and set to "0" if the remainder is positive. Flip flop $E_0$ together with carry flip flop $K_a$ controls this setting. In other words, if the remainder after a step in the square root process is positive, then the next step is to subtract the number derived from the equation $2^{-i}(R_i+2^{-i-2})$ from the previous remainder which is the new operand. The term $2^{-i-2}$ insures that the two most right bits will always be 01 during subtraction. Likewise, when the sign of the previous remainder is negative and the next step is to add, the term $3\times2^{-i-2}$ insures that the two most right bits will always be 11. Thus the previously obtained partial root bits are augmented by $2^{-i-2}$ if subtracting, or by three times this amount if adding. The bit stored in $C_2$ is shifted to $C_7$ at $T_1$, $C_7$ is shifted to $C_6$ at $T_2$, and $C_6$ is shifted to both $C_5$ and $C_1$ during $T_2$ through $T_4$. Thus the bits stored in $C_1$ at $T_3$, $T_4$, and $T_5$ are the next three bits of the number to be added or subtracted in the next step. In other words, the next three bits in accordance with the equation for determining the next number to be added to or subtracted from the operand are derived by the shifting of register C in accordance with the equations. At $T_5$ of each word time the new bit of the partial root is inserted in $C_7$ to be stored therein at $T_1$ of each word time. The root is recirculated as previously described, thus building up the square root in the C register for each word time of operation. During the last word time the square root stored in C is shifted to A. The logical equations for the C register are as follows:

$$C_1: {}_1c_1=T_5U'_1C+T'_5T'_1C_6C+T_1E_0U'_1C$$
$${}_0c_1=T'_5U'_1+T'_5T'_1C'_6C+T_1E'_0U'_1C$$
$$C_2: {}_1c_2=C_3C$$
$${}_0c_2=C'_3C$$
$$C_3: {}_1c_3=C_4C$$
$${}_0c_3=C'_4C$$
$$C_4: {}_1c_4=C_5C$$
$${}_0c_4=C'_5C$$
$$C_5: {}_1c_5=C_6C$$
$${}_0c_5=C'_6C$$

$C_6 : {}_1c_6 = C_7C$ ${}_0c_6 = C'_7C$ $C_7 : {}_1c_7 = E'_0K'_aU'_1T_5C + A_1K_aU'_1T_5C + C_2T_5$ ${}_0c_7 = E_0K'_aT_5C + A'_1K_aU'_1T_5C + C'_2T'_5$

Turning now to FIG. 11 there is shown a diagram showing the step by step operation of the computer during the extraction of the square root of a binary number. The condition of each flip flop is shown during the various bit times of operation. For purposes of illustration, binary number .0001 with the binary point ossumed to be to the left of the last digit will be used as the operand. Binary number .0001 is equivalent to decimal fraction 1/16. Binary number .0001 is assumed to be stored in the A register during bit time $T_1$ of word time $W_1$. Binary number .0001, the operand, being a four bit number, is initially stored in flip flops $A_1$, $A_2$, $A_3$, and $A_4$. Four bit times later at $T_5$ the operand is stored in flip flops $B_4$, $B_5$, $B_6$, and $B_7$. The first two bits of the operand to be operated on are now stored in $B_7$ and $B_6$. At $T_5$ of $W_1$ and $T_1$ of $W_2$ these bits are shifted into $A_1$ where, along with 3 zeros, initially set into $A_1$ for $T_3$, $T_4$, and $T_5$ of $W_2$, they will form the first operand 81. Digit 1 is inserted in $C_1$ at $T_5$ of $W_1$ and digit 0 is inserted in $C_1$ at $T_1$ of $W_2$ which together with three more zeros shifted into $C_1$ from $C_6$, form the number obtained from the expression enclosed in 82. During $W_2$ the number enclosed by 82 is subtracted from by the number enclosed by 81 by means of the circuitry shown in FIG. 9 with the result stored in $A_7$ forming the first remainder enclosed in 83. Since the most significant digit of the number in 83 is 1 (stored in $A_7$ at $T_1$ of $W_3$) a 0 is inserted in $C_7$ by logic control and is stored there at $T_1$ of $W_3$. This is the first partial root. During $W_2$ the A register is shifting as shown to place three digits of the first remainder in $A_1$ along with the two next digits of the operand shifted into $A_1$ from $B_7$ and $B_6$ during $T_5$ and $T_1$ of every word time. The B register is shifted during $W_2$ in order to shift the operand two bits to the left to place the two next bits to be operated on in the correct position. The resulting storage in $A_1$ comprises second operand to be operated on in the second step as enclosed by 84.

During word time $W_3$ the first parallel root 0 stored in $C_7$ at $T_1$ is shifted in register C to $C_1$ at $T_3$ to form part of the next number to be subtracted or added to the operand, and also recirculated in register C arriving at $C_2$ at $T_1$ of word time $W_4$. The next number is inserted in $C_1$ during $W_3$, partly from logic control and partly from the recirculation pattern of C as shown by 85. Because the first step in the operation produced a negative remainder, the bits stored in $C_1$ as described by 85 are now added by logic control to the bits stored in $A_1$ as described by 84 with the result being stored in $A_7$ as denoted by 86 which is the remainder of the second step. Since this remainder is positive as noted by the 0 stored in $A_7$ at $T_1$ of $W_4$, a 1 is stored in $C_7$ at $T_1$ of $W_4$ by logic control. This is the second partial root.

The third step continues during $W_4$ with $C_1$ denoted as 87 being subtracted from $A_1$, enclosed by 88, with the remainder being stored in $A_7$ enclosed by 89. The sign of the remainder of the third step being a minus, as noted by the 1 stored in $A_7$ at $T_1$ of $W_5$, a 0 partial root is stored in $C_7$ at $T_1$ of $W_5$.

The fourth step continues during $W_5$ with the contents of $C_1$, enclosed by 90, being added to the contents of $A_1$ enclosed by 91, with the remainder being stored in $A_7$ enclosed by 92. Since the sign of the remainder is negative as shown by the 1 stored in $A_7$ at $T_1$ of $W_6$, a 0 root is stored in $C_7$ at $T_1$ of $W_6$.

During word times $W_3$, $W_4$, and $W_5$ the partial roots stored in $C_7$ at $T_1$ of each word time are recirculated in C so as to arrive at $C_3$, $C_4$, and $C_5$ in the proper order at $T_5$ of $W_5$ as enclosed by 93. During word time 6 the square root, enclosed by 93, is shifted from C to A being stored in A together with the last root in proper sequence at the $T_1$ following $T_5$ of $W_6$, enclosed by 94.

As prevoiusly noted, the square root process takes *n* word times for an *n* bit number. As, for example, the extraction of the square root of binary number .0001 took four word times in the example of FIG. 11. The number of bit times in each word time is determined by the number of flip flops in the registers. For example, the B register, having 7 flip flops, needs to shift the operand stored therein two bits to the left each word time. This takes 5 bit times. So far the example in FIG. 10, four word times, each having 5 bit times are required for the extraction of the square root.

It is to be noted that the invention is not limited to the configuration shown in FIG. 11. The binary number need not be limited to 4 bits but the maximum number of bits is determined by the capacity of the storage registers. Also the binary point was shown as being to the left of the most significant bit for illustration purpose, it being readily understood by those familiar with the art that the binary point may be placed anywhere.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a square root computer of the binary, digital type in which computation takes place in a series of steps characterized by the flowing of a binary number bit by bit from one storage device to another, means for shifting a binary number constituting a first operand to the left two orders for each step of computation so that each bit thereof is successively advanced into an active position of highest order, means for generating a binary number constituting a second operand for each step of operation, means for subtracting said second operand from said first operand for the first step of operation to obtain a first remainder and for subtracting said second operand from said first operand for each subsequent step in which the remainder of the previous step is positive and for adding said second operand to said first operand for each subsequent step in which the remainder of the previous step is negative, and means responsive to the sign of the remainder of each step for storing a binary bit, each said binary bit being a bit of the square root of said binary number.

2. The combination in claim 1 wherein said means for generating a binary number constituting said second operand comprise logical control means responsive to predetermined logic equations for producing a second operand whose two lowest significant bits are 01 when the remainder of the previous step is positive and are 11 when the remainder of the previous step is negative.

3. The computer of claim 1 wherein said means for generating a binary number constituting a second operand comprises means for adding either a first increment or second increment three times greater than the first increment to previously obtained bits of the square root for each step according to whether the remainder of the previous step is negative or positive, said second operand comprising the sum of said previously obtained square root bits and one of said increments.

4. In a square root computer of the digital type in which the binary bits are represented by plus and minus electrical signals and in which computation takes place in a series of steps each characterized by the flowing of a binary number bit by bit from one storage device to another, means for shifting a binary number constituting a first operand to the left two orders for each step of computation so that each bit thereof is successively advanced into an active position of highest order, means for generating a binary number constituting a second operand for each step of operation, means for subtracting said second operand from said first operand for the first step of computation to obtain a first remainder, said first remainder constituting said first operand for the second step of computation, means for subtracting said second operand from said first operand during said second step and each subsequent step when the remainder of the previous step is positive and adding said second operand to said first operand when the remainder is negative, means responsive to the sign of the remainder of each step for storing binary bit 1 when the sign of said remainder is positive and for storing binary bit 0 when the sign of said remainder is negative, said binary bits being indicative of the bits comprising the square root of said binary number.

5. In combination first, second, and third storage registers adapted to store binary numbers represented by a plurality of bits for shifting said bits a predetermined number of orders during each bit time of operation, means for storing a binary number in said second register, said binary number designated as a first operand, means for shifting said first operand to the left two bits for each step of computation so that each bit thereof is successively advanced into an active position of highest order, means for transferring the two highest order bits of said first operand to said first storage register for each step of computation, said two highest order bits comprising the two lowest order bits of the first operand for each step of operation, logic means for generating a binary number constituting a second operand for each step of operation, the lowest order bit of said second operand being a 1 for each step of operation, means for transferring said second operand to said third storage register, means for combining said first operand and said second operand for each step of operation to produce a remainder, and means responsive to the sign of the remainder of each step for storing a binary bit in said third storage register, each said binary bit constituting one bit of the square root of said binary number.

6. The combination in claim 5 wherein said combining means comprises means for subtracting said second operand from said first operand during the first step of operation, and means for subtracting said second operand from said first operand for each subsequent step in which the remainder of the previous step is positive and for adding said second operand to said first operand for each subsequent step in which the remainder of the previous step is negative.

7. The combination in claim 5 wherein said logic means comprises logical control circuitry for producing the two lowest order bits of said second operand for each step of operation, and means for shifting the bits stored in said third storage with the aid of said logical control circuitry to produce the higher order bits of said second operand.

8. In a square root computer of the digital type in which the two binary bits are represented by 1 and 0 and in which computation takes place in a series of steps, a first, second, and third storage register for storing binary numbers, means for storing a first binary number in said second storage register, means for shifting said binary number in said second storage register to the left two orders for each of said steps of computation so that each bit thereof is successively advanced into an active position of highest order, means for transferring the two highest order bits of said first binary number to said first storage register for each step of computation, said two highest order bits comprising the two lowest order bits of a first operand for each step of operation, logical control means for producing the two lowest order bits of a second binary number and storing said bits in said third storage register for each step of computation, said two bits of said second binary number constituting the two lowest bits of a second operand, means for recirculating said first storage device with the aid of said logic control means to produce the remaining bits of said first operand, means for recirculating said third storage device with the aid of said logic control means to produce the remaining bits of said second operand, means for subtracting said second operand from said first operand during the first step of computation to obtain a remainder, means for subtracting said second operand from said first operand for the second and subsequent steps when the remainder of the previous step is positive and for adding said second operand to said first operand when the remainder of the previous step is negative, means responsive to the sign of each said remainder for producing a bit of the partial root of said first binary number and storing said bit in said third storage register for each step of computation, and means for recirculating said third storage register to develop a third binary number denoting the square root of said first binary number.

9. Means for obtaining the square root of an operand in a binary digital computer comprising means for subtracting an increment from said operand to obtain a first remainder and a first partial root digit according to the sign of the remainder, means responsive to the sign of successively obtained remainders for either (*a*) augmenting a previously obtained partial root by a first increment and substracting such augmented root from the previous remainder to obtain a next remainder or (*b*) augmenting a previously obtained partial root by a second increment and adding such augmented root to the previous remainder to obtain a next remainder, means for shifting said operand to advance the digits thereof to positions of two higher orders of significance for each step of the computation, means for appending the two highest orders of said operand to successively obtained remainders, and means responsive to the sign of successively obtained remainders for obtaining successive partial root digits each corresponding to a given remainder sign.

10. The structure of claim 9 wherein said means for augmenting a previously obtained partial root includes means for generating said first increment with a magnitude of $2^{-i-2}$ and said second increment with a magnitude of three times $2^{-i-2}$ where $i$ denotes a step in the square root computation.

References Cited in the file of this patent

UNITED STATES PATENTS

| | | |
|---|---|---|
| 2,624,508 | Dickinson et al. | Jan. 6, 1953 |
| 2,636,672 | Hamilton et al. | Apr. 28, 1953 |
| 2,888,200 | Weiss | May 26, 1959 |
| 2,934,268 | Felker | Apr. 26, 1960 |

OTHER REFERENCES

Progress Report No. 2 on the Edvac, Moore School of Electrical Engineering, Univ. of Penn. (June 30, 1946, declassified February 1947), pages relied on 1–4–3 to 1–4–6.

Lenaerts: Automatic Square Rooting, Electronic Engineering (July 1955), pages 287 to 289.